US007163906B2

(12) United States Patent
McDaniel et al.

(10) Patent No.: US 7,163,906 B2
(45) Date of Patent: Jan. 16, 2007

(54) ORGANOCHROMIUM/METALLOCENE COMBINATION CATALYSTS FOR PRODUCING BIMODAL RESINS

(75) Inventors: Max P. McDaniel, Bartlesville, OK (US); Elizabeth A. Benham, Spring, TX (US); Michael D. Jensen, Bartlesville, OK (US); Kathy S. Collins, Bartlesville, OK (US); Joel L. Martin, Bartlesville, OK (US); Gil R. Hawley, Dewey, OK (US)

(73) Assignee: Chevron Phillips Chemical Company, LLP, The Woodlands, TX (US)

( * ) Notice: Subject to any disclaimer, the term of this patent is extended or adjusted under 35 U.S.C. 154(b) by 0 days.

(21) Appl. No.: 10/980,996

(22) Filed: Nov. 4, 2004

(65) Prior Publication Data

US 2006/0094590 A1    May 4, 2006

(51) Int. Cl.
*B01J 31/32* (2006.01)
*B01J 37/00* (2006.01)
*C08F 4/22* (2006.01)
*C08F 4/44* (2006.01)
*C08F 297/04* (2006.01)

(52) U.S. Cl. .................... 502/117; 526/114; 525/54
(58) Field of Classification Search ................ 502/117; 526/114; 525/54
See application file for complete search history.

(56) References Cited

U.S. PATENT DOCUMENTS

| | | |
|---|---|---|
| 3,119,569 A | 1/1964 | Baricordi |
| 3,887,494 A | 6/1975 | Dietz |
| 4,081,407 A | 3/1978 | Short et al. |
| 4,152,503 A | 5/1979 | Short et al. |
| 4,364,842 A | 12/1982 | McDaniel et al. |
| 4,364,854 A | 12/1982 | McDaniel et al. |
| 4,364,855 A | 12/1982 | McDaniel et al. |
| 4,392,990 A | 7/1983 | Witt |
| 4,397,765 A | 8/1983 | McDaniel |
| 4,405,501 A | 9/1983 | Witt |
| 4,424,341 A | 1/1984 | Hanson et al. |
| 4,436,882 A | 3/1984 | Witt |
| 4,436,883 A | 3/1984 | Witt |
| 4,444,962 A | 4/1984 | McDaniel et al. |
| 4,444,964 A | 4/1984 | McDaniel et al. |
| 4,444,965 A | 4/1984 | McDaniel et al. |
| 4,444,966 A | 4/1984 | McDaniel |
| 4,501,885 A | 2/1985 | Sherk et al. |
| 4,504,638 A | 3/1985 | McDaniel et al. |
| 4,613,484 A | 9/1986 | Ayres et al. |
| 4,701,432 A | 10/1987 | Welborn, Jr. |
| 4,737,280 A | 4/1988 | Hanson |
| 4,871,705 A | 10/1989 | Hoel |
| 4,900,704 A | 2/1990 | McDaniel et al. |
| 4,939,217 A | 7/1990 | Stricklen |
| 4,981,831 A | 1/1991 | Knudsen et al. |
| 5,064,797 A | 11/1991 | Stricklen |
| 5,075,394 A | 12/1991 | McDaniel et al. |
| 5,191,132 A | 3/1993 | Patsidis et al. |
| 5,210,352 A | 5/1993 | Alt et al. |
| 5,332,706 A | 7/1994 | Nowlin et al. |
| 5,347,026 A | 9/1994 | Patsidis et al. |
| 5,399,636 A | 3/1995 | Alt et al. |
| 5,401,817 A | 3/1995 | Palackal et al. |
| 5,420,320 A | 5/1995 | Zenk et al. |
| 5,436,305 A | 7/1995 | Alt et al. |
| 5,451,649 A | 9/1995 | Zenk et al. |
| 5,496,781 A | 3/1996 | Geerts et al. |
| 5,498,581 A | 3/1996 | Welch et al. |
| 5,539,076 A | 7/1996 | Nowlin et al. |
| 5,541,272 A | 7/1996 | Schmid et al. |
| 5,554,795 A | 9/1996 | Frey et al. |
| 5,563,284 A | 10/1996 | Frey et al. |
| 5,565,592 A | 10/1996 | Patsidis et al. |
| 5,571,880 A | 11/1996 | Alt et al. |
| 5,576,259 A | 11/1996 | Hasegawa et al. |
| 5,594,078 A | 1/1997 | Welch et al. |
| 5,597,892 A | 1/1997 | Hanson |
| 5,624,877 A | 4/1997 | Bergmeister et al. |
| 5,631,203 A | 5/1997 | Welch et al. |
| 5,631,355 A | 5/1997 | Asaka et al. |

(Continued)

FOREIGN PATENT DOCUMENTS

EP     0763550 A1     3/1997

(Continued)

OTHER PUBLICATIONS

Thorimbert, S. et al., Selective Heterogeneous Epoxidations with Cp-Titanium Chloride Derived Microporous Silica Glasses, Tetrahedron, 1995, 3787-3792, vol. 51 (13), Elsevier Science Ltd.

(Continued)

*Primary Examiner*—J. A. Lorengo
*Assistant Examiner*—Elizabeth A. Bolden
(74) *Attorney, Agent, or Firm*—Merchant & Gould

(57) ABSTRACT

This invention relates to the field of olefin polymerization catalyst compositions, and methods for the polymerization and copolymerization of olefins, including polymerization methods using a supported catalyst composition. In one aspect, the present invention encompasses a catalyst composition comprising the contact product of at least one metallocene compound, at least one organochromium compound, at least one chemically-treated solid oxide, and at least one organoaluminum compound.

20 Claims, 2 Drawing Sheets

U.S. PATENT DOCUMENTS

| | | |
|---|---|---|
| 5,648,439 A | 7/1997 | Bergmeister et al. |
| 5,654,454 A | 8/1997 | Peifer et al. |
| 5,668,230 A | 9/1997 | Schertl et al. |
| 5,705,579 A | 1/1998 | Hawley et al. |
| 5,723,399 A * | 3/1998 | Takemoto et al. .......... 502/113 |
| 5,747,405 A | 5/1998 | Little et al. |
| 5,807,938 A | 9/1998 | Kaneko et al. |
| 5,919,983 A | 7/1999 | Rosen et al. |
| 6,107,230 A | 8/2000 | McDaniel et al. |
| 6,165,929 A | 12/2000 | McDaniel et al. |
| 6,242,622 B1 | 6/2001 | Oda et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,391,816 B1 | 5/2002 | McDaniel et al. |
| 6,395,666 B1 | 5/2002 | McDaniel et al. |
| 6,509,427 B1 | 1/2003 | Welch et al. |
| 6,524,987 B1 | 2/2003 | Collins et al. |
| 6,528,448 B1 | 3/2003 | Jensen et al. |
| 6,528,596 B1 * | 3/2003 | Takaoki et al. ............. 526/113 |
| 6,548,441 B1 | 4/2003 | McDaniel et al. |
| 6,613,852 B1 | 9/2003 | McDaniel et al. |
| 6,794,326 B1 * | 9/2004 | Follestad et al. ........... 502/117 |
| 6,828,395 B1 * | 12/2004 | Ehrman et al. ............. 526/114 |
| 6,833,417 B1 * | 12/2004 | Ehrman et al. ............... 526/82 |
| 6,884,748 B1 * | 4/2005 | McCullough ............... 502/117 |
| 6,894,131 B1 * | 5/2005 | McCullough et al. ....... 526/160 |
| 2003/0207756 A1 * | 11/2003 | McDaniel et al. .......... 502/204 |
| 2004/0006186 A1 | 1/2004 | Jensen et al. |

FOREIGN PATENT DOCUMENTS

| | | |
|---|---|---|
| EP | 0970963 A1 | 1/2000 |
| EP | 1114832 A1 | 7/2001 |
| WO | WO 97/08213 | 3/1997 |
| WO | WO 99/60033 A1 | 11/1999 |
| WO | WO 01/44309 A1 | 6/2001 |
| WO | WO 0144309 A1 * | 6/2001 |
| WO | WO 01/83498 A1 | 11/2001 |

OTHER PUBLICATIONS

Corradini, P. et al., Colinera Bonds at the Oxygen Atom, Journal of the American Chemical Society, 1959, 5510-5511, vol. 82, American Chemical Society, Washington, D.C..

Gorish, R., Preparation and Properties of Cyclopentadienyl Titanium Trichloride, Journal of the American Chemical Society, 1960, 4211-4215, vol. 82, American Chemical Society, Washington, D.C..

Frederick J. Karol, et al.; "Ethylene Polymerization Studies with Supported Cyclopentadienyl, Arene, and Allyl Chromium Catalysts", Journal of Polymer Science, Polymer Chemistry Ed., 13(7), 1975, pp. 1607-1617.

International Search Report and Written Opinion, PCT/US04/036650, Aug. 16, 2005, 13 pgs.

* cited by examiner

ORGANOCHROMIUM/METALLOCENE COMBINATION CATALYSTS FOR PRODUCING BIMODAL RESINS

TECHNICAL FIELD OF THE INVENTION

This invention relates to the field of organometal compositions, olefin polymerization catalyst compositions, methods for the polymerization and copolymerization of olefins using a catalyst composition, and polyolefins.

BACKGROUND OF THE INVENTION

There exists a constant search to develop new olefin polymerization catalysts, catalyst activation processes, and methods of making and using catalysts, that will provide enhanced catalytic activities and polymeric materials tailored to specific end uses. Mono-1-olefins (α-olefins), including ethylene, can be polymerized with catalyst compositions employing titanium, zirconium, vanadium, chromium or other metals, impregnated on a variety of support materials, often in the presence of cocatalysts. These catalyst compositions may be useful for both homopolymerization of ethylene, as well as copolymerization of ethylene with comonomers such as propylene, 1-butene, 1-hexene, or other higher α-olefins.

Catalyst systems comprising metallocene compounds have shown promise in tailoring polymer properties. Catalyst systems comprising organochromium compounds can also be used to modify polymer properties. Accordingly, a process employing both metallocene and organochromium catalysts would provide exceptional control over polymer properties during manufacture. However, there is not a single support capable of activating both types of catalysts. Thus, there remain significant challenges in developing catalysts that can provide custom-made polymers with a specific set of desired properties.

SUMMARY OF THE INVENTION

This invention encompasses catalyst compositions, methods for preparing catalyst compositions, methods for polymerizing olefins, and ethylene polymers and copolymers. In the course of examining olefin polymerization catalysts, it was discovered that a catalyst system comprising metallocenes and organochromium compounds provided polyolefins having very broad molecular weight distributions.

In one aspect, the present invention encompasses a catalyst composition comprising a metallocene compound, an organochromium compound, at least one chemically-treated solid oxide, and at least one organoaluminum compound. In this aspect, this invention encompasses a composition of matter, a catalyst composition for polymerizing olefins, a method of preparing a catalyst composition, a method of using a catalyst composition, new polymers and copolymers of ethylene, and the like, in each case encompassing a metallocene compound, an organochromium compound, at least one chemically-treated solid oxide, and at least one organoaluminum compound.

Catalyst compositions in accordance with the present invention comprise the contact product of at least one metallocene compound, at least one organochromium compound, at least one chemically-treated solid oxide, and at least one organoaluminum compound, wherein:

a) the metallocene compound has the following formula:

$(X^1)(X^2)(X^3)(X^4)M^1$, wherein $M^1$ is titanium, zirconium, or hafnium;

wherein $(X^1)$ is a cyclopentadienyl, an indenyl, a fluorenyl, a substituted cyclopentadienyl, a substituted indenyl, or a substituted fluorenyl;

wherein substituents on $(X^1)$ are aliphatic groups, cyclic groups, combinations of aliphatic and cyclic groups, silyl groups, alkyl halide groups, halides, organometallic groups, phosphorus groups, nitrogen groups, silicon groups, boron groups, germanium groups, or hydrogen;

wherein at least one substituent on $(X^1)$ can be a bridging group which connects $(X^1)$ and $(X^2)$;

wherein $(X^3)$ and $(X^4)$ are independently a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein $(X^2)$ is a cyclopentadienyl, an indenyl, a fluorenyl, a substituted cyclopentadienyl, a substituted indenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein substituents on $(X^2)$ are aliphatic groups, cyclic groups, combinations of aliphatic groups and cyclic groups, silyl groups, alkyl halide groups, halides, organometallic groups, phosphorus groups, nitrogen groups, phosphido groups, boron groups, germanium groups, or hydrogen; and wherein at least one substituent on $(X^2)$ can be a bridging group which connects $(X^1)$ and $(X^2)$;

b) the organochromium is a compound having the following formula:

i) $CrR_n$,
   wherein R is a hydrocarbyl having from 1 to about 20 carbon atoms; and
   wherein n is an integer from 2 to 4 inclusive; or ii) $Cr(\eta_6\text{-}C_6R'_6)_2$,
   wherein R' independently is hydrogen or an alky radical having from 1 to 6 carbon atoms; and c) the chemically-treated solid oxide comprises a solid oxide treated with at least one electron-withdrawing anion source compound.

Organoaluminum compounds employed in the present invention have the following formula:

$Al(X^5)_n(X^6)_{3-n}$;

wherein $(X^5)$ is a hydrocarbyl having from 1 to about 20 carbon atoms; $(X^6)$ is an alkoxide or aryloxide having from 1 to about 20 carbon atoms, a halide, or a hydride; and n is a number from 1 to 3, inclusive.

A chemically-treated solid oxide in accordance with the present invention comprises a solid oxide treated with an electron-withdrawing anion. Solid oxides include, but are not limited to, silica, alumina, silica-alumina, aluminum phosphate, heteropolytungstates, titania, zirconia, magnesia, boria, zinc oxide, any mixed oxide thereof, or any mixture thereof. Electron-withdrawing anions include, but are not limited to, fluoride, chloride, bromide, phosphate, triflate, bisulfate, sulfate, fluorophosphate, fluorosulfate, or any combination thereof.

In another aspect of the present invention, the chemically-treated solid oxide can be selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof. Futher, the chemically treated solid oxide can include a metal or metal ion selected from zinc, nickel, vanadium, silver, copper, gallium, tin, tungsten, molybdenum, or any combination thereof.

In yet another aspect of the present invention, the solid oxide can comprise any oxide that is characterized by a high surface area, and the electron-withdrawing anion can comprise any anion that increases the acidity of the solid oxide as compared to the solid oxide that is not treated with at least one electron-withdrawing anion.

In another aspect of the present invention, a catalyst composition is provided comprising the contact product of a metallocene compound, an organochromium compound, at least one chemically-treated solid oxide, and at least one organoaluminum compound, and further comprising an optional cocatalyst. While not intending to be bound by theory, it is believed that the cocatalyst functions as, among other things, a scavenger to remove traces of water and oxygen from the catalyst composition. Several different cocatalysts may be used in this catalyst composition including, but not limited to, organoaluminum compounds, aluminoxanes, organozinc compounds, organoboron compounds, ionizing ionic compounds, clay materials, or any combination thereof. Thus, an additional organoaluminum compound is an optional cocatalyst, and can be either the same or different from the at least one organoaluminum compound of the catalyst composition.

In yet another aspect of the present invention, a method is provided for making a catalyst composition comprising contacting at least one metallocene compound, at least one organochromium compound, at least one chemically-treated solid oxide, and at least one organoaluminum compound. Still, in another aspect of this invention a method of polymerizing olefins is provided comprising contacting at least one olefin monomer with a catalyst composition under polymerization conditions. The catalyst composition comprises the contact product of a metallocene compound, an organochromium compound, at least one chemically-treated solid oxide, and at least one organoaluminum compound.

In accordance with the present invention, the at least one metallocene compound, the at least one organochromium compound, the at least one chemically-treated solid oxide, and the at least one organoaluminum compound are as follows:

The metallocene compound has the following formula:

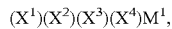

wherein $M^1$ is titanium, zirconium, or hafnium;
wherein $(X^1)$ is a cyclopentadienyl, an indenyl, a fluorenyl, a substituted cyclopentadienyl, a substituted indenyl, or a substituted fluorenyl;

wherein substituents on $(X^1)$ are aliphatic groups, cyclic groups, combinations of aliphatic and cyclic groups, silyl groups, alkyl halide groups, halides, organometallic groups, phosphorus groups, nitrogen groups, silicon groups, boron groups, germanium groups, or hydrogen;

wherein at least one substituent on $(X^1)$ can be a bridging group which connects $(X^1)$ and $(X^2)$;

wherein $(X^3)$ and $(X^4)$ are independently a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein $(X^2)$ is a cyclopentadienyl, an indenyl, a fluorenyl, a substituted cyclopentadienyl, a substituted indenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein substituents on $(X^2)$ are aliphatic groups, cyclic groups, combinations of aliphatic groups and cyclic groups, silyl groups, alkyl halide groups, halides, organometallic groups, phosphorus groups, nitrogen groups, phosphido groups, boron groups, germanium groups, or hydrogen; and wherein at least one substituent on $(X^2)$ can be a bridging group which connects $(X^1)$ and $(X^2)$.

The organochromium compound is a compound having the following formula:

i) $CrR_n$,
wherein R is a hydrocarbyl having from 1 to about 20 carbon atoms; and
wherein n is an integer from 2 to 4 inclusive; or ii) $Cr(\eta_6\text{-}C_6R'_6)_2$,
wherein R' independently is hydrogen or an alky radical having from 1 to 6 carbon atoms.

The chemically-treated solid oxide comprises a solid oxide treated with an electron-withdrawing anion source compound.

The organoaluminum compound has the following formula:

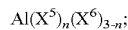

wherein $(X^5)$ is a hydrocarbyl having from 1 to about 20 carbon atoms; $(X^6)$ is selected from alkoxide or aryloxide having from 1 to about 20 carbon atoms, halide, or hydride; and n is a number from 1 to 3, inclusive.

This invention also encompasses precontacting some or all of the catalyst components, and optionally pretreating some or all of these components with an olefin compound, prior to initiating the polymerization reaction.

The present invention further comprises methods for polymerizing olefins comprising contacting at least one olefin monomer and the catalyst composition under polymerization conditions to produce the polymer.

This invention also encompasses an article that comprises the polymer produced with the catalyst composition of this invention.

These and other features, aspects, embodiments, and advantages of the present invention will become apparent after a review of the following detailed description of the disclosed features.

DETAILED DESCRIPTION OF THE INVENTION

Figure 1:
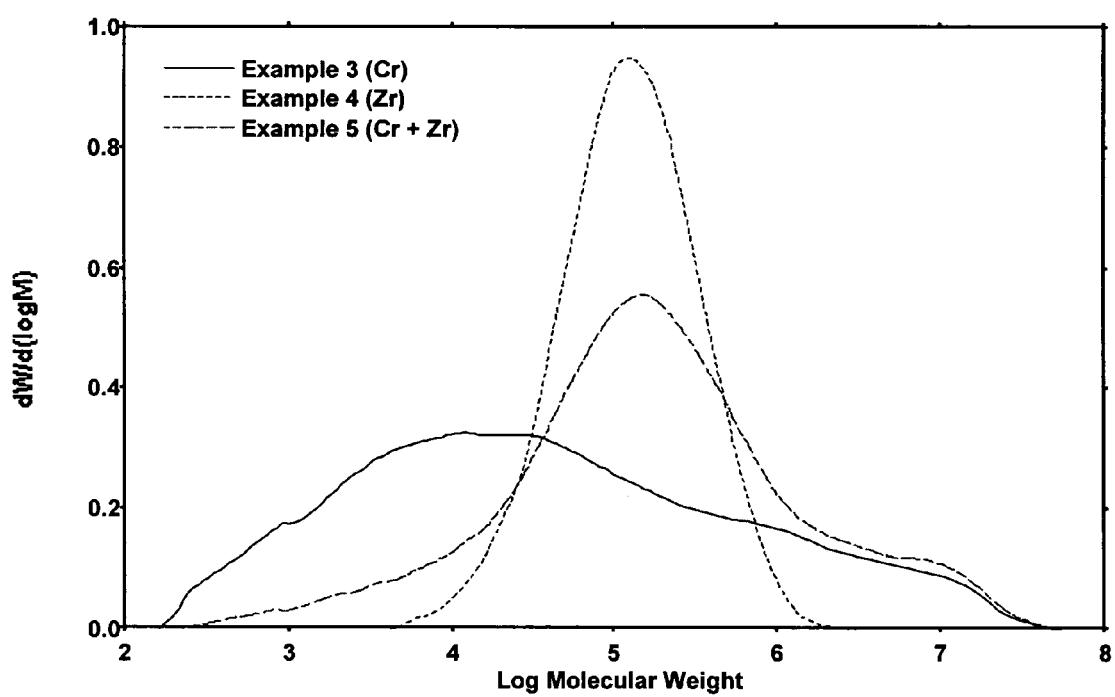
FIG. 1 represents a comparison of polyolefin polydispersities obtained using a bis(n-butylcyclopentadienyl)zirconium dichloride catalyst, a biscumene chromium catalyst, and a combination bis(n-butylcyclopentadienyl)zirconium dichloride/bis cumene chromium catalyst.

The present invention provides new catalyst compositions, methods for preparing catalyst compositions, methods for using the catalyst compositions to polymerize olefins, and polyolefins. In one aspect, this invention encompasses a metallocene-organochromium catalyst system that provides polyolefins characterized by very broad molecular weight distributions. The catalyst composition comprises the contact product of at least one metallocene compound, at least one organochromium compound, at least one chemically-treated solid oxide, and at least one organoaluminum compound. Further, this invention encompasses a composition of matter, a catalyst composition for polymerizing olefins, a method of preparing a catalyst composition, a method of using a catalyst composition, new polymers and copolymers ethylene, and the like.

DEFINITIONS

To more clearly define the terms used herein, the following definitions are provided. To the extent that any definition or usage provided by any document incorporated herein by reference conflicts with the definition or usage provided herein, the definition or usage provided herein controls.

The term "polymer" is used herein to mean homopolymers comprising ethylene and copolymers of ethylene and another olefinic comonomer. Thus, the term "a polymer of ethylene" is used herein to refer to both homopolymers and copolymers of ethylene and an olefinic comonomer. Polymer is also used herein to mean homopolymers and copolymers of any other polymerizable monomer disclosed herein.

The term "cocatalyst" is generally used herein to refer to the organoaluminum compounds that may constitute one component of the catalyst composition, but also refers to the optional components of the catalyst composition including, but not limited to, aluminoxanes, organoboron compounds, organozinc compounds, or ionizing ionic compounds, as disclosed herein. The term cocatalyst may be used regardless of the actual function of the compound or any chemical mechanism by which the compound may operate. In one aspect, the term cocatalyst is used to distinguish that component of the catalyst composition from the metallocene and organochromium compounds.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture describes a mixture of metallocene compound, organochromium compound, and chemically-treated solid oxide, before this mixture is contacted with the organoaluminum compound and olefin monomer. Thus, "precontacted" describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene and the olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of metallocene compound, organochromium compound, olefin monomer, organoaluminum compound, and chemically treated solid oxide, formed from contacting the precontacted mixture of a portion of these components with any additional components added to make up the postcontacted mixture. Generally, the additional component added to make up the postcontacted mixture is the chemically treated solid oxide, and optionally may include an organoaluminum compound the same or different from the organoaluminum compound used to prepare the precontacted mixture, as described herein. Accordingly, this invention may also occasionally distinguish between a component used to prepare the postcontacted mixture and that component after the mixture has been prepared.

The term metallocene describes a compound comprising two $\eta^5$-cycloalkadienyl-type ligands in the molecule. Thus, the metallocenes of this invention are bis($\eta^5$-cycloalkadienyl-type ligand) compounds, wherein the $\eta^5$-cycloalkadienyl portions include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst", in much the same way the term "cocatalyst" is used herein to refer to the organoaluminum compound.

The terms "catalyst composition," "catalyst mixture," and the like do not depend upon the actual product of the reaction of the components of the mixtures, the nature of the active catalytic site, or the fate of the aluminum cocatalyst, the metallocene compound, the organochromium compound, any olefin monomer used to prepare a precontacted mixture, or the chemically treated solid oxide after combining these components. Therefore, the terms catalyst composition, catalyst mixture, and the like may include both heterogeneous compositions and homogenous compositions.

The term "hydrocarbyl" is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

The terms "chemically-treated solid oxide", "solid oxide activator-support", "acidic activator-support", "activator-support", "treated solid oxide compound", or simply "activator," and the like are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically treated solid oxide compound comprises the calcined contact product of at least one solid oxide compound with at least one electron-withdrawing anion source compound. Typically, the chemically treated solid oxide comprises at least one ionizing, acidic solid oxide compound. The terms support or activator-support are not used to imply these components are inert, and this component should not be construed as an inert component of the catalyst composition.

Unless specified otherwise, or unless the context requires otherwise, certain abbreviations that are used herein, include, but not limited to: Ind, indenyl; Flu, fluorenyl; Cp, cyclopentadienyl; C2, ethylene; C6, 1-hexene; iC4, isobutane; FSA, fluorided silica-alumina; CTSO, chemically-treated solid oxide.

The phrase "at least one" is used herein to indicate that one or more respective components may be used in any combination. For example, the catalyst composition is described as comprising the contact-product of at least one metallocene compound, at least one organochromium compound, at least one chemically-treated solid oxide, and at least one organoaluminum compound. Thus, the catalyst composition may comprise one metallocene compound, one organochromium compound, one chemically-treated solid oxide, and one organoaluminum compound. Alternatively, the catalyst composition may comprise more than one metallocene compound, more than one organochromium compound, more than one chemically-treated solid oxide, and more than one organoaluminum compound. In the same fashion, one component may be combined with more than one of any of the other components. For example, the catalyst composition may comprise more than one metallocene compound, one organochromium compound, one chemically-treated solid oxide, and more than one organoaluminum compound.

Catalyst Composition and Components

The present invention provides a catalyst composition comprising a metallocene compound, an organochromium compound, at least one chemically-treated solid oxide, and at least one organoaluminum compound. In another aspect, for example, a metallocene compound and an organochromium compound are used simultaneously in a polymerization process to produce a polyethylene resin with unique properties.

Catalyst compositions of the present invention comprise the contact product of at least one metallocene compound, at least one organochromium compound, at least one chemically-treated solid oxide, and at least one organoaluminum compound.

The metallocene compound has the following formula:

$$(X^1)(X^2)(X^2)(X^3)(X^4)M^1,$$

wherein $M^1$ is titanium, zirconium, or hafnium;

wherein $(X^1)$ is a cyclopentadienyl, an indenyl, a fluorenyl, a substituted cyclopentadienyl, a substituted indenyl, or a substituted fluorenyl;

wherein substituents on $(X^1)$ are aliphatic groups, cyclic groups, combinations of aliphatic and cyclic groups, silyl groups, alkyl halide groups, halides, organometallic groups, phosphorus groups, nitrogen groups, silicon groups, boron groups, germanium groups, or hydrogen;

wherein at least one substituent on $(X^1)$ can be a bridging group which connects $(X^1)$ and $(X^2)$;

wherein $(X^3)$ and $(X^4)$ are independently a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein $(X^2)$ is a cyclopentadienyl, an indenyl, a fluorenyl, a substituted cyclopentadienyl, a substituted indenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein substituents on $(X^2)$ are aliphatic groups, cyclic groups, combinations of aliphatic groups and cyclic groups, silyl groups, alkyl halide groups, halides, organometallic groups, phosphorus groups, nitrogen groups, phosphido groups, boron groups, germanium groups, or hydrogen; and wherein at least one substituent on $(X^2)$ can be a bridging group which connects $(X^1)$ and $(X^2)$.

Organochromium compounds employed in the present invention have the following formula:

i) $CrR_n$, wherein R is a hydrocarbyl having from 1 to about 20 carbon atoms; and wherein n is an integer from 2 to 4 inclusive; or ii) $Cr(\eta_6-C_6R'_6)_2$, wherein R' independently is hydrogen or an alky radical having from 1 to 6 carbon atoms.

A chemically-treated solid oxide in accordance with the present invention comprises a solid oxide treated with an electron-withdrawing anion source compound.

The present invention further encompasses catalyst compositions comprising various combinations of metallocene and organochromium compounds, including, but not limited to, at least one metallocene compound in combination with an organochromium compound, a metallocene compound in combination with at least one organochromium compound, at least one metallocene compound in combination with at least one organochromium compound, and any combination of more than one metallocene compound and any combination of more than one organochromium compound.

Organoaluminum compounds employed in the present invention have the following formula:

$$Al(X^5)_n(X^6)_{3-n};$$

wherein $(X^5)$ is a hydrocarbyl having from 1 to about 20 carbon atoms; $(X^6)$ is selected from alkoxide or aryloxide having from 1 to about 20 carbon atoms, halide, or hydride; and n is a number from 1 to 3, inclusive.

As stated above, the chemically-treated solid oxide comprises a solid oxide treated with an electron-withdrawing anion. Solid oxides employed in the present invention include, but are not limited to, silica, alumina, silica-alumina, aluminum phosphate, heteropolytungstates, titania, zirconia, magnesia, boria, zinc oxide, any mixed oxide thereof, or any mixture thereof. Electron-withdrawing anions include, but are not limited to, fluoride, chloride, bromide, phosphate, triflate, bisulfate, sulfate, or any combination thereof.

The Metallocene Compound

Metallocene compounds employed in the present invention can have the following general formula:

$$(X^1)(X^2)(X^3)(X^4)M^1,$$

wherein $M^1$ is titanium, zirconium, or hafnium;

wherein $(X^1)$ is a cyclopentadienyl, an indenyl, a fluorenyl, a substituted cyclopentadienyl, a substituted indenyl, or a substituted fluorenyl;

wherein substituents on $(X^1)$ are aliphatic groups, cyclic groups, combinations of aliphatic and cyclic groups, silyl groups, alkyl halide groups, halides, organometallic groups, phosphorus groups, nitrogen groups, silicon groups, boron groups, germanium groups, or hydrogen;

wherein at least one substituent on $(X^1)$ can be a bridging group which connects $(X^1)$ and $(X^2)$;

wherein $(X^3)$ and $(X^4)$ are independently a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein $(X^2)$ is a cyclopentadienyl, an indenyl, a fluorenyl, a substituted cyclopentadienyl, a substituted indenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein substituents on $(X^2)$ are aliphatic groups, cyclic groups, combinations of aliphatic groups and cyclic groups, silyl groups, alkyl halide groups, halides, organometallic groups, phosphorus groups, nitrogen groups, phosphido groups, boron groups, germanium groups, or hydrogen; and wherein at least one substituent on $(X^2)$ can be a bridging group which connects $(X^1)$ and $(X^2)$.

In another aspect of the present invention, the metallocence compound can have the following general formula:

$$(X^1)(X^2)(X^3)(X^4)M^1,$$

wherein $M^1$ is Ti, Zr, or Hf;

wherein $(X^1)$ is a cyclopentadienyl, an indenyl, a fluorenyl, a substituted cyclopentadienyl, a substituted indenyl, or a substituted fluorenyl;

wherein $(X^2)$ is a cyclopentadienyl, a substituted cyclopentadienyl, an indenyl, a substituted indenyl, a fluorenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein $(X^3)$ and $(X^4)$ are independently a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein any substituent on $(X^1)$, $(X^2)$, $(X^3)$, or $(X^4)$ is independently selected from a hydrocarbyl group, an aliphatic group, an aromatic group, a cyclic group, a combination of aliphatic and cyclic groups, an oxygen group, a sulfur group, a nitrogen group, a phosphorus group, a carbon group, a silicon group, a germanium group, a tin group, a boron group, an aluminum group, an inorganic group, an organometallic group, or a substituted derivative thereof, having from 1 to about 20 carbon atoms; a halide; or hydrogen; as long as these groups do not terminate the activity of the catalyst composition. Further, this description can include substituted, unsubstituted, branched, linear, or heteroatom-substituted analogs of these moieties.

Further, substituents may be characterized in more than one of these categories, such as benzyl. As indicated above, hydrogen may be employed as a substituent. Therefore, the notion of a substituted indenyl and substituted fluorenyl includes partially saturated indenyls and fluorenyls including, but not limited to, tetrahydroindenyls, tetrahydrofluorenyls, and octahydrofluorenyls.

At least one substituent on ($X^1$) or ($X^2$) can be a bridging group that connects ($X^1$) and ($X^2$). Suitable bridging groups include, but are not limited to, aliphatic groups, cyclic groups, combinations of aliphatic groups and cyclic groups, phosphorous groups, nitrogen groups, organometallic groups, silicon groups, phosphido groups, boron groups, and germanium groups.

Examples of aliphatic groups, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having from one to about 20 carbon atoms. Thus, aliphatic groups include, but are not limited to, hydrocarbyls such as paraffins and alkenyls. For example, aliphatic groups as used herein include methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Examples of aromatic groups, in each instance include, but are not limited to, phenyl, naphthyl, anthacenyl, and the like, including substituted derivatives thereof, in each instance having from 6 to about 25 carbons. Substituted derivatives of aromatic compounds include, but are not limited to, tolyl, xylyl, mesityl, and the like, including any heteroatom substituted derivative thereof.

Examples of cyclic groups, in each instance include, but are not limited to, cycloparaffins, cycloolefins, cycloacetylenes, arenes such as phenyl, bicyclic groups and the like, including substituted derivatives thereof, in each instance having from about 3 to about 20 carbon atoms. Thus, heteroatom-substituted cyclic groups such as furanyl are included herein.

In each instance, aliphatic and cyclic groups are groups comprising an aliphatic portion and a cyclic portion, examples of which include, but are not limited to, groups such as: —$(CH_2)_m C_6 H_q R_{5-q}$ wherein m is an integer from 1 to about 10, q is an integer from 1 to 5, inclusive; $(CH_2)_m C_6 H_q R_{10-q}$ wherein m is an integer from 1 to about 10, q is an integer from 1 to 10, inclusive; and $(CH_2)_m C_5 H_q R_{9-q}$ wherein m is an integer from 1 to about 10, q is an integer from 1 to 9, inclusive. In each instance and as defined above, R is independently selected from: an aliphatic group; an aromatic group; a cyclic group; any combination thereof; any substituted derivative thereof, including but not limited to, a halide-, an alkoxide-, or an amide-substituted derivative thereof; any one of which has from 1 to about 20 carbon atoms; or hydrogen. In one aspect, aliphatic and cyclic groups include, but are not limited to: —$CH_2C_6H_5$; —$CH_2C_6H_4F$; —$CH_2C_6H_4Cl$; —$CH_2C_6H_4Br$; —$CH_2C_6H_4I$; —$CH_2C_6H_4OMe$; —$CH_2C_6H_4OEt$; —$CH_2C_6H_4NH_2$; —$CH_2C_6H_4NMe_2$; —$CH_2C_6H_4NEt_2$; —$CH_2CH_2C_6H_5$; —$CH_2CH_2C_6H_4F$; —$CH_2CH_2C_6H_4Cl$; —$CH_2CH_2C_6H_4Br$; —$CH_2CH_2C_6H_4I$; —$CH_2CH_2C_6H_4OMe$; —$CH_2CH_2C_6H_4OEt$; —$CH_2CH_2C_6H_4NH_2$; —$CH_2CH_2C_6H_4NMe_2$; —$CH_2CH_2C_6H_4NEt_2$; any regioisomer or stereoisomer thereof, and any substituted derivative thereof.

Examples of halides, in each instance, include fluoride, chloride, bromide, and iodide.

In each instance, oxygen groups are oxygen-containing groups, examples of which include, but are not limited to, alkoxy or aryloxy groups (—OR), —$OSiR_3$, —$OPR_2$, —$OAlR_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms. Examples of alkoxy or aryloxy groups (—OR) groups include, but are not limited to, methoxy, ethoxy, propoxy, butoxy, phenoxy, substituted phenoxy, and the like.

In each instance, sulfur groups are sulfur-containing groups, examples of which include, but are not limited to, —SR, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, nitrogen groups are nitrogen-containing groups, which include, but are not limited to, —$NH_2$, —NHR, —$NR_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, phosphorus groups are phosphorus-containing groups, which include, but are not limited to, —$PH_2$, —PHR, —$PR_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, carbon groups are carbon-containing groups, which include, but are not limited to, alkyl halide groups that comprise halide-substituted alkyl groups with 1 to about 20 carbon atoms, aralkyl groups with 1 to about 20 carbon atoms, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, silicon groups are silicon-containing groups, which include, but are not limited to, silyl groups such alkylsilyl groups, arylsilyl groups, arylalkylsilyl groups, siloxy groups, and the like, which in each instance have from 1 to about 20 carbon atoms. For example, silicon groups include trimethylsilyl and phenyloctylsilyl groups.

In each instance, germanium groups are germanium-containing groups, which include, but are not limited to, germyl groups, such as alkylgermyl groups, arylgermyl groups, arylalkylgermyl groups, germyloxy groups, and the like, which in each instance have from 1 to about 20 carbon atoms.

In each instance, tin groups are tin-containing groups, which include, but are not limited to, stannyl groups, such as alkylstannyl groups, arylstannyl groups, arylalkylstannyl groups, stannoxy (or "stannyloxy") groups, and the like, which in each instance have from 1 to about 20 carbon atoms. Thus, tin groups include, but are not limited to, stannoxy groups.

In each instance, boron groups are boron-containing groups, which include, but are not limited to, —$BR_2$, —$BX_2$, —BRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

In each instance, aluminum groups are aluminum-containing groups, which include, but are not limited to, —AlR$_2$, wherein R in each instance is selected from alkyl, cycloalkyl, aryl, aralkyl, substituted alkyl, substituted aryl, or substituted aralkyl having from 1 to about 20 carbon atoms.

Examples of inorganic groups that may be used as substituents for substituted cyclopentadienyls, substituted indenyls, substituted fluorenyls, and substituted boratabenzenes, in each instance, include, but are not limited to, —OAlX$_2$, —OSiX$_3$, —OPX$_2$, —SX, —PX$_2$, and the like, wherein X is a monoanionic group such as halide, hydride, amide, alkoxide, alkyl thiolate, and the like, and wherein any alkyl, cycloalkyl, aryl, aralkyl, substituted alkyl, substituted aryl, or substituted aralkyl group or substituent on these ligands has from 1 to about 20 carbon atoms.

Examples of organometallic groups that may be used as substituents for substituted cyclopentadienyls, substituted indenyls, and substituted fluorenyls, in each instance, include, but are not limited to, organoboron groups, organoaluminum groups, organogallium groups, organosilicon groups, organogermanium groups, organotin groups, organolead groups, organo-transition metal groups, and the like, having from 1 to about 20 carbon atoms.

Examples of the metallocene compound of this invention include, but are not limited to, the following compounds:

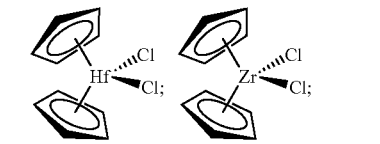

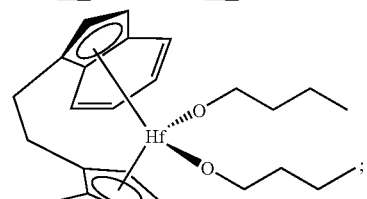

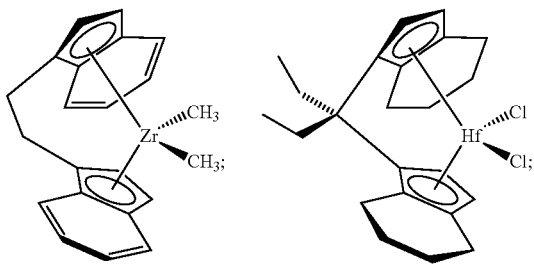

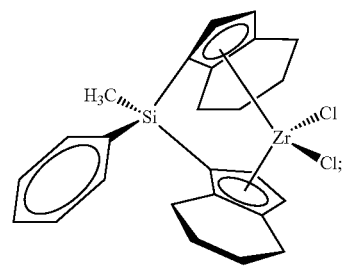

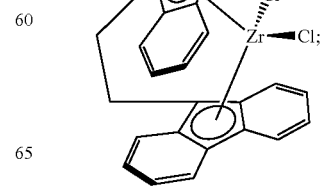

-continued

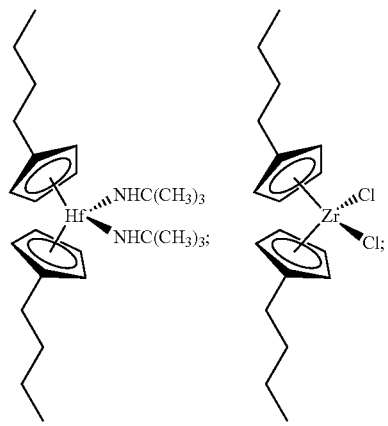

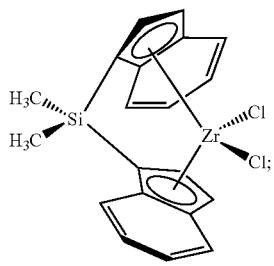

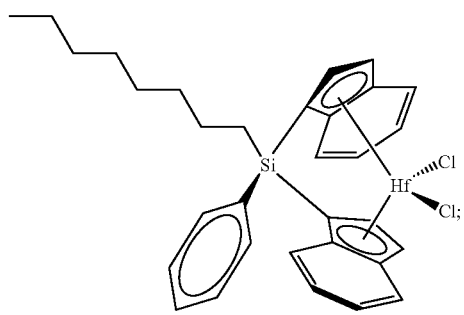

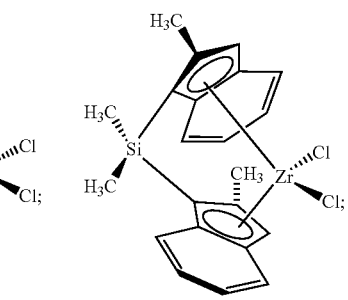

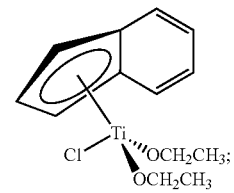

-continued

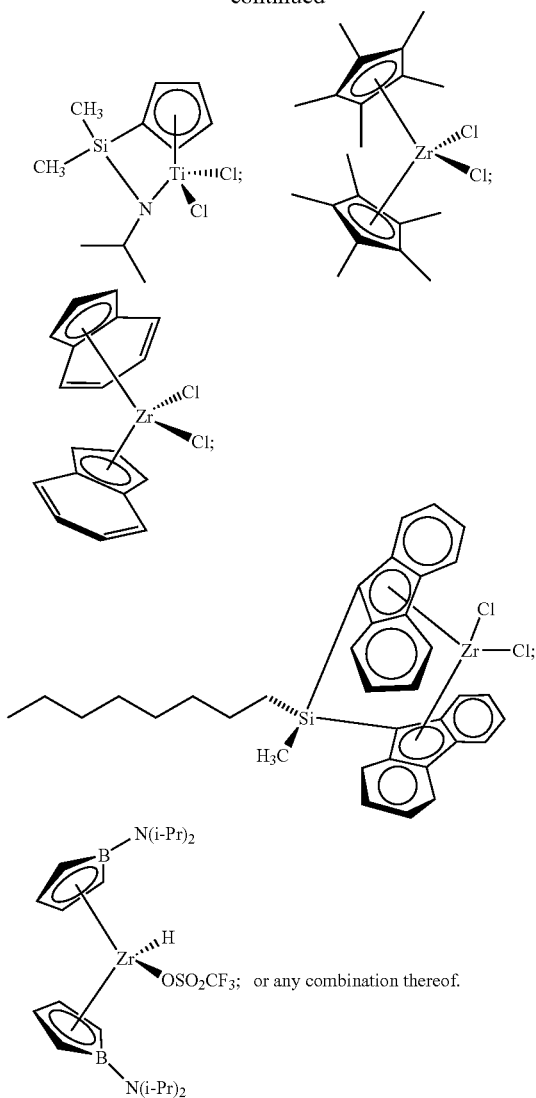

or any combination thereof.

Examples of the metallocene compound of this invention also include, but are not limited to, the following compounds:

bis(cyclopentadienyl)hafnium dichloride; 1,2-ethanediylbis($\eta^5$-1-indenyl)di-n-butoxyhafnium; 1,2-ethanediylbis($\eta^5$-1-indenyl)dimethylzirconium; 3,3-pentanediylbis(($\eta^5$-4,5,6,7-tetrahydro-1-indenyl)hafnium dichloride; methylphenylsilylbis($\eta^5$-4,5,6,7-tetrahydro-1-indenyl)zirconium dichloride; bis(n-butylcyclopentadienyl)bis(di-t-butylamido)hafnium; bis(n-butylcyclopentadienyl)zirconium dichloride; dimethylsilylbis(1-indenyl)zirconium dichloride; octylphenylsilylbis(1-indenyl)hafnium dichloride; dimethylsilylbis($\eta^5$-4,5,6,7-tetrahydro-1-indenyl)zirconium dichloride; dimethylsilylbis(2-methyl-1-indenyl)zirconium dichloride; 1,2-ethanediylbis(9-fluorenyl)zirconium dichloride; indenyl diethoxy titanium(IV) chloride; (isopropylamidodimethylsilyl)cyclopentadienyltitanium dichloride; bis(pentamethylcyclopentadienyl)zirconium dichloride; bis(indenyl)zirconium dichloride; bis(indenyl)zirconium dichloride; methyloctylsilyl bis(9-fluorenyl)zirconium dichloride; bis-[1-(N,N-diisopropylamino)boratebenzene] hydridozirconium trifluoromethylsulfonate; or any combination thereof.

In one aspect of the present invention, the metallocene compounds include, but are not limited to, bis(n-butylcyclopentadienyl)zirconium dichloride, bis(indenyl)zirconium dichloride, dimethylsilylbis(1-indenyl)zirconium dichloride, and methyloctylsilyl bis(9-fluorenyl)zirconium dichloride. Suitable metallocene compounds are also described in U.S. Pat. Nos. 6,355,594 and 6,613,852, the entire disclosures of which are incorporated herein by reference.

Numerous processes to prepare metallocene compounds that can be employed in this invention have been reported. For example, U.S. Pat. Nos. 4,939,217, 5,191,132, 5,210,352, 5,347,026, 5,399,636, 5,401,817, 5,420,320, 5,436,305, 5,451,649, 5,496,781, 5,498,581, 5,541,272, 5,554,795, 5,563,284, 5,565,592, 5,571,880, 5,594,078, 5,631,203, 5,631,335, 5,654,454, 5,668,230, 5,705,579, and 6,509,427 describe such methods, each of which is incorporated by reference herein, in its entirety. Other processes to prepare metallocene compounds that can be employed in this invention have been reported in references such as: Köppl, A. Alt, H. G. *J. Mol. Catal A.* 2001, 165, 23; Kajigaeshi, S.; Kadowaki, T.; Nishida, A.; Fujisaki, S. *The Chemical Society of Japan*, 1986, 59, 97; Alt, H. G.; Jung, M.; Kehr, G. *J. Organomet. Chem.* 1998, 562, 153–181; and Alt, H. G.; Jung, M. *J. Organomet. Chem.* 1998, 568, 87–112; each of which is incorporated by reference herein, in its entirety. Further, additional processes to prepare metallocene compounds that can be employed in this invention have been reported in: *Journal of Organometallic Chemistry*, 1996, 522, 39–54, which is incorporated by reference herein, in its entirety. The following treatises also describe such methods: Wailes, P. C.; Coutts, R. S. P.; Weigold, H. in Organometallic Chemistry of Titanium, Zirconium, and Hafnium, Academic; New York, 1974; Cardin, D. J.; Lappert, M. F.; and Raston, C. L.; Chemistry of Organo-Zirconium and —Hafnium Compounds; Halstead Press; New York, 1986; each of which is incorporated by reference herein, in its entirety.

The Organochromium Compound

Organochromium compounds employed in the present invention have the following general formula:

i) $CrR_n$,
wherein R is a hydrocarbyl having from 1 to about 20 carbon atoms; and
wherein n is an integer from 2 to 4 inclusive; or
ii) $Cr(\eta_6-C_6R'_6)_2$,
wherein R' independently is hydrogen or an alky radical having from 1 to 6 carbon atoms.

Examples of the organochromium compound of this invention include, but are not limited to, the following compounds:

bisbenzene chromium(0); dicumene chromium(0); bis(mesitylene) chromium(0); biscyclopentadienylchromium (chromocene); bis(methylcyclopentadienyl)chromium(II); bis(1,3-bis(trimethylsilyl)allyl)chromium(II); bis(trimethylsilylmethyl)chromium(II); bis(2,5-dimethylpentadienyl) chromium(II); ((tetramethylcyclopentadienyl)(t-butylamino)dimethylsilyl)(trimethylsilylmethyl)chromium(II); diallyl chromium(II); (pentamethylcyclopentadienyl)bis (benzyl)chromium(II) pyridine adduct; triallyl chromium (III); tris(bis(trimethylsilyl)methyl)chromium(III); (pentamethylcyclopentadienyl)bis(trimethylsilylmethyl)chromium (III); tetraallylchromium(IV); tetramethylchromium(IV); tetrakis(benzyl)chromium(IV); tetrakis-neopentyl chromium(IV), tetrakis(trimethylsilylmethyl)chromium(IV); tetrakis(isopropyl)chromium(IV); tetrakis(2-phenyl-2-methylpropyl)chromium(IV); or any combination thereof.

Examples of the organochromium compound of this invention also include, but are not limited to, the following compounds:

($\eta^6$-C$_6$H$_6$)Cr(CO)$_3$; [($\eta^5$-C$_5$H$_5$)Cr(CO)$_3$]$_2$; Cr(t-butyl)$_4$; Cr(CH$_2$CPh$_3$)$_4$; Cr(MeC$_6$H$_5$)$_2$; Cr(Me$_2$C$_6$H$_4$)$_2$; CR(Me$_3$C$_6$H$_3$)$_2$; Cr(C$_6$Me$_6$)$_2$; Cr($\eta^6$-naphthalene)$_2$; regioisomers and stereoisomers thereof; or any combination thereof.

In one aspect of the present invention, organochromium compounds include, but are not limited to, dicumene chromium (0), bisbenzene chromium(0), and chromocene.

The Chemically Treated Solid Oxide

The present invention encompasses catalyst compositions comprising a chemically-treated solid oxide which serves as an acidic activator-support, and which is typically used in combination with an organoaluminum compound.

In one aspect of this invention, the catalyst composition can comprise at least one chemically-treated solid oxide comprising at least one solid oxide treated with at least one electron-withdrawing anion. The solid oxide can comprise any oxide that is characterized by a high surface area, and the electron-withdrawing anion can comprise any anion that increases the acidity of the solid oxide as compared to the solid oxide that is not treated with at least one electron-withdrawing anion. Solid oxides employed in the present invention include, but are not limited to, silica, alumina, silica-alumina, aluminum phosphate, heteropolytungstates, titania, zirconia, magnesia, boria, zinc oxide, any mixed oxide thereof, or any mixture thereof.

The electron-withdrawing anion is selected from fluoride, chloride, bromide, phosphate, triflate, bisulfate, sulfate, fluorophosphate, fluorosulfate, or any combination thereof. In another aspect, for example, the chemically-treated solid oxide can be selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof. In a further aspect of the present invention, the chemically-treated solid oxide can further comprise a metal or metal ion selected from zinc, nickel, vanadium, silver, copper, gallium, tin, tungsten, molybdenum, or any combination thereof.

The chemically-treated solid oxide typically comprises the contact product of at least one solid oxide compound and at least one electron-withdrawing anion source. In one aspect, the solid oxide compound comprises an inorganic oxide. It is not required that the solid oxide compound be calcined prior to contacting the electron-withdrawing anion source. The contact product may be calcined either during or after the solid oxide compound is contacted with the electron-withdrawing anion source. In this aspect, the solid oxide compound may be calcined or uncalcined. In another aspect, the activator-support may comprise the contact product of at least one calcined solid oxide compound and at least one electron-withdrawing anion source.

The chemically-treated solid oxide, also termed the activator-support, exhibits enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of cocatalysts, it is not necessary to eliminate cocatalysts from the catalyst composition. The activation function of the activator-support is evident in the enhanced activity of catalyst composition as a whole, as compared to a catalyst composition containing the corresponding untreated solid oxide. Additionally, the chemically-treated solid oxide can function as an activator, even in the absence of an organoaluminum compound, an aluminoxane, an organoboron compound, or an ionizing ionic compound.

The present invention includes a chemically-treated solid oxide comprising a solid inorganic oxide material, a mixed oxide material, a combination of inorganic oxide materials, a combination of mixed oxide materials, or any combination thereof, that is chemically-treated with an electron-withdrawing component, and optionally treated with a metal. Thus, the solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound, and are encompassed by this invention.

In one aspect of this invention, the chemically-treated solid oxide further comprises a metal or metal ion selected from zinc, nickel, vanadium, titanium, silver, copper, gallium, tin, tungsten, molybdenum, or any combination thereof. Examples of chemically-treated solid oxides that further comprise a metal or metal ion include, but are not limited to, zinc-impregnated chlorided alumina, titanium-impregnated fluorided alumina, zinc-impregnated fluorided alumina, zinc-impregnated chlorided silica-alumina, zinc-impregnated fluorided silica-alumina, zinc-impregnated sulfated alumina, chlorided zinc aluminate, fluorided zinc aluminate, sulfated zinc aluminate, or any combination thereof.

In another aspect, the chemically-treated solid oxide of this invention comprises a solid oxide of relatively high porosity, which exhibits Lewis acidic or Brnsted acidic behavior. The solid oxide is chemically-treated with an electron-withdrawing component, typically an electron-withdrawing anion, to form an activator-support. While not intending to be bound by the following statement, it is believed that treatment of the inorganic oxide with an electron-withdrawing component augments or enhances the acidity of the oxide. Thus in one aspect, the activator-support exhibits Lewis or Brønsted acidity which is typically greater than the Lewis or Brønsted acid strength than the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

In one aspect, the chemically-treated solid oxide comprises a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide comprises oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used in the chemically-treated solid oxide of the present invention include, but are not limited to, Al$_2$O$_3$, B$_2$O$_3$, BeO, Bi$_2$O$_3$, CdO, Co$_3$O$_4$, Cr$_2$O$_3$, CuO, Fe$_2$O$_3$, Ga$_2$O$_3$, La$_2$O$_3$, Mn$_2$O$_3$, MoO$_3$, NiO, P$_2$O$_5$, Sb$_2$O$_5$, SiO$_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. Examples of mixed oxides that can be used in the activator-support of the present invention include, but are not limited to, silica-alumina, silica-titania, silica-zirconia, zeolites, many clay minerals, alumina-titania, alumina-zirconia, zinc-aluminate and the like.

In one aspect of this invention, the solid oxide material is chemically-treated by contacting it with at least one electron-withdrawing component, typically an electron-withdrawing anion source. Further, the solid oxide material is optionally chemically-treated with a metal ion, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and optionally the metal ion is calcined.

The electron-withdrawing component used to treat the oxide is any component that increases the Lewis or Brønsted acidity of the solid oxide upon treatment. In one aspect, the electron-withdrawing component is an electron-withdrawing anion derived from a salt, an acid, or other compound such as a volatile organic compound that may serve as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. In addition, other ionic or non-ionic compounds that serve as sources for these electron-withdrawing anions may also be employed in the present invention.

When the electron-withdrawing component comprises a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron withdrawing anions, in varying proportions, can be used to tailor the specific acidity of the activator-support to the desired level. Combinations of electron withdrawing components may be contacted with the oxide material simultaneously or individually, and any order that affords the desired chemically-treated solid oxide acidity. For example, one aspect of this invention is employing two or more electron-withdrawing anion source compounds in two or more separate contacting steps. Thus, one example of such a process by which a chemically-treated solid oxide is prepared is as follows: a selected solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they may be the same compound.

In one aspect of the invention, the solid oxide activator-support (chemically-treated solid oxide) may be produced by a process comprising:

1) contacting a solid oxide compound with at least one electron-withdrawing anion source compound to form a first mixture; and 2) calcining the first mixture to form the solid oxide activator-support.

In another aspect of this invention, the solid oxide activator-support (chemically-treated solid oxide) is produced by a process comprising:

1) contacting at least one solid oxide compound with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support. Thus, the solid oxide activator-support is sometimes referred to simply as a treated solid oxide compound.

Another aspect of this invention is producing or forming the chemically-treated solid oxide by contacting at least one solid oxide with at least one electron-withdrawing anion source compound, wherein the at least one solid oxide compound is calcined before, during or after contacting the electron-withdrawing anion source, and wherein, optionally, there is a substantial absence of aluminoxanes, organoborates, and/or ionizing ionic compounds.

In one aspect of this invention, once the solid oxide has been treated and dried, it may be subsequently calcined. Calcining of the treated solid oxide is generally conducted in an ambient atmosphere, typically in a dry ambient atmosphere, at a temperature from about 200° C. to about 900° C., and for a time of about 1 minute to about 100 hours. In another aspect, calcining is conducted at a temperature from about 300° C. to about 800° C. and in another aspect, calcining is conducted at a temperature from about 400° C. to about 700° C. In yet another aspect, calcining is conducted from about 1 hour to about 50 hours, and in another aspect calcining is conducted, from about 3 hours to about 20 hours. In still another aspect, calcining may be carried out from about 1 to about 10 hours at a temperature from about 350° C. to about 550° C.

Further, any type of suitable ambient can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the present invention, the solid oxide component used to prepare the chemically-treated solid oxide has a pore volume greater than about 0.1 cc/g. In another aspect, the solid oxide component has a pore volume greater than about 0.5 cc/g, and in yet another aspect, greater than about 1.0 cc/g. In still another aspect, the solid oxide component has a surface area from about 100 to about 1000 $m^2/g$. In another aspect, solid oxide component has a surface area from about 200 to about 800 m²/g, and in still another aspect, from about 250 to about 600 m²/g.

The solid oxide material may be treated with a source of halide ion or sulfate ion, or a combination of anions, and optionally treated with a metal ion, then calcined to provide the chemically-treated solid oxide in the form of a particulate solid. In one aspect, the solid oxide material is treated with a source of sulfate, termed a sulfating agent, a source of chloride ion, termed a chloriding agent, a source of fluoride ion, termed a fluoriding agent, or a combination thereof, and calcined to provide the solid oxide activator. In another aspect, useful acidic activator-supports include, but are not limited to: bromided alumina; chlorided alumina; fluorided alumina; sulfated alumina; bromided silica-alumina, chlorided silica-alumina; fluorided silica-alumina; sulfated silica-alumina; bromided silica-zirconia, chlorided silica-zirconia; fluorided silica-zirconia; sulfated silica-zirconia; a pillared clay such as a pillared montmorillonite, optionally treated with fluoride, chloride, or sulfate; phosphated alumina, or other aluminophosphates, optionally treated with sulfate, fluoride, or chloride; or any combination thereof. Further, any of the activator-supports may optionally be treated with a metal ion.

In one aspect of this invention, the chemically-treated solid oxide comprises a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but not limited to, the one to three carbon alcohols because of their volatility and low surface tension. Examples of fluoriding agents that can be used in this invention include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride(hexafluorosilicate) (($NH_4)_2SiF_6$), ammonium hexafluorophosphate ($NH_4PF_6$), analogs thereof, and combinations thereof. For example, ammonium bifluoride $NH_4HF_2$ may be used as the fluoriding agent, due to its ease of use and ready availability.

In another aspect of the present invention, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself can also be used when the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide can comprise a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present invention, the solid oxide can be treated with a chloriding agent during the calcining step. Any chloriding agent capable of serving as a source of chloride and thoroughly contacting the oxide during the calcining step can be used. For example, volatile organic chloriding agents may be used. Examples of volatile organic choriding agents useful in this aspect of the invention include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

In one aspect, the amount of fluoride or chloride ion present before calcining the solid oxide is generally from about 2 to about 50% by weight, where the weight percents are based on the weight of the solid oxide, for example silica-alumina, before calcining. In another aspect, the amount of fluoride or chloride ion present before calcining the solid oxide is from about 3 to about 25% by weight, and in another aspect, from about 4 to about 20% by weight. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina can have an alumina content from about 5 to about 95%. In one aspect, the alumina content of the silica-alumina may be from about 8 to about 50%, and in another aspect, the alumina content of the silica-alumina may be from about 10% to about 30% alumina by weight. In yet another aspect, the solid oxide component can comprise alumina without silica and in another aspect, the solid oxide component can comprise silica without alumina. Silica-titania, as used in the present invention, can have a titanium content from about 1% to about 20%, and in another aspect, the titanium content can be from about 2% to about 10% titanium by weight. In yet another aspect, the solid oxide component can comprise titania without silica and in another aspect, the solid oxide component can comprise silica without titania. Silica-zirconia, as used in the present invention, can have a zirconium content from about 2% to about 35%, and in another aspect, the zirconium content can be from about 4% to about 20%. In yet another aspect, the solid oxide component can comprise zirconia without silica and in another aspect, the solid oxide component can comprise silica without zirconia.

The sulfated solid oxide comprises sulfate and a solid oxide component such as alumina or silica-alumina, in the form of a particulate solid. Optionally, the sulfated oxide is further treated with a metal ion such that the calcined sulfated oxide comprises a metal. In one aspect, the sulfated solid oxide comprises sulfate and alumina. In one aspect of this invention, the sulfated alumina is formed by a process wherein the alumina is treated with a sulfate source, for example selected from, but not limited to, sulfuric acid or a sulfate salt such as ammonium sulfate. This process may be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

The amount of sulfate ion present before calcining is generally from about 0.5 parts by weight to about 100 parts by weight sulfate ion to about 100 parts by weight solid oxide. In another aspect, the amount of sulfate ion present before calcining is generally from about 1 part by weight to about 50 parts by weight sulfate ion to about 100 parts by weight solid oxide, and in still another aspect, from about 5 parts by weight to about 30 parts by weight sulfate ion to about 100 parts by weight solid oxide. These weight ratios are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immediately.

In addition to being treated with an electron-withdrawing component such as halide or sulfate ion, the solid inorganic oxide of this invention may optionally be treated with a metal source, including metal salts or metal-containing compounds. These compounds may be added to or impregnated onto the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, or any combination thereof. For example, zinc may be used to impregnate the solid oxide because it provides good catalyst activity and low cost. The solid oxide may be treated with metal salts or metal-containing compounds before, after, or at the same time that the solid oxide is treated with the electron-withdrawing anion.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

Various processes to prepare solid oxide activator-supports that can be employed in this invention have been reported. For example, U.S. Pat. Nos. 4,364,842, 4,364,854, 4,364,855, 4,397,765, 4,900,704, 4,444,962, 4,444,964, 4,444,965, 4,444,966, 4,504,638, 6,107,230, 6,165,929, 6,294,494, 6,300,271, 6,316,553, 6,355,594, 6,376,415, 6,391,816, 6,395,666, 6,524,987, and 6,548,441, describe such methods, each of which is incorporated by reference herein, in its entirety.

The metallocene compound, the organochromium compound, or a combination thereof, may be precontacted with an olefin monomer and an organoaluminum compound for a first period of time prior to contacting this mixture with the chemically-treated solid oxide. Once the precontacted mixture of the metallocene compound, the organochromium compound, olefin monomer, and organoaluminum compound is contacted with the chemically-treated solid oxide, the composition further comprising the chemically-treated solid oxide is termed the "postcontacted" mixture. The postcontacted mixture may be allowed to remain in further contact for a second period of time prior to being charged into the reactor in which the polymerization process will be carried out.

The Organoaluminum Compound

Organoaluminum compounds that can be used in this invention include, but are not limited to, compounds with the formula:

$$Al(X^5)_n(X^6)_{3-n},$$

wherein $(X^5)$ is a hydrocarbyl having from 1 to about 20 carbon atoms; $(X^6)$ is selected from alkoxide or aryloxide, any one of which having from 1 to about 20 carbon atoms, halide, or hydride; and n is a number from 1 to 3, inclusive. In one aspect, $(X^5)$ is an alkyl having from 1 to about 10 carbon atoms. Examples of $(X^5)$ moieties include, but are not limited to, ethyl, propyl, n-butyl, sec-butyl, isobutyl, hexyl, and the like. In another aspect, $(X^6)$ may be independently selected from fluoro or chloro. In yet another aspect, $(X^6)$ may be chloro.

In the formula $Al(X^5)_n(X^6)_{3-n}$, n is a number from 1 to 3 inclusive, and typically, n is 3. The value of n is not restricted to be an integer, therefore this formula includes sesquihalide compounds or other organoaluminum cluster compounds.

Generally, examples of organoaluminum compounds that can be used in this invention include, but are not limited to, trialkylaluminum compounds, dialkylaluminium halide compounds, dialkylaluminum alkoxide compounds, dialkylaluminum hydride compounds, and combinations thereof. Specific examples of organoaluminum compounds that are useful in this invention include, but are not limited to: trimethylaluminum (TMA); triethylaluminum (TEA); tripropylaluminum; diethylaluminum ethoxide; tributylaluminum; disobutylaluminum hydride; triisobutylaluminum; and diethylaluminum chloride.

In one aspect, the present invention comprises precontacting the metallocene compound, the organochromium compound, or a combination thereof with at least one organoaluminum compound and an olefin monomer to form a precontacted mixture, prior to contacting this precontacted mixture with the solid oxide activator-support to form the active catalyst. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator. However, all the organoaluminum compound may be used to prepare the catalyst in either the precontacting or postcontacting step. Alternatively, all the catalyst components may be contacted in a single step.

Further, more than one organoaluminum compound may be used, in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed, regardless of whether a single organoaluminum compound is used, or more than one organoaluminum compound. In another aspect, triethylaluminum (TEA) or triisobutylaluminum are typical organoaluminum compounds used in this invention.

Optional Cocatalysts

The Optional Aluminoxane Cocatalyst

One aspect of the invention encompasses a catalyst composition comprising at least one metallocene compound, at least one organochromium compound, at least one chemically-treated solid oxide, at least one organoaluminum compound, and, optionally, an aluminoxane cocatalyst. Aluminoxanes are also referred to as poly(hydrocarbyl aluminum oxides) or organoaluminoxanes. The other catalyst components are typically contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the polymerization reactor without being isolated.

The aluminoxane compound of this invention is an oligomeric aluminum compound, wherein the aluminoxane compound can comprise linear structures, cyclic, or cage structures, or typically mixtures of all three. Cyclic aluminoxane compounds having the formula:

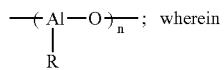; wherein

R is a linear or branched alkyl having from 1 to 10 carbon atoms, and n is an integer from 3 to about 10 are encompassed by this invention. The $(AlRO)_n$ moiety shown here also constitutes the repeating unit in a linear aluminoxane. Thus, linear aluminoxanes having the formula:

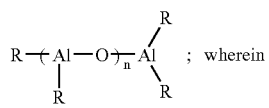; wherein

R is a linear or branched alkyl having from 1 to 10 carbon atoms, and n is an integer from 1 to about 50, are also encompassed by this invention.

Further, aluminoxanes may also have cage structures of the formula $R^t_{5m+\alpha}R^b_{m-\alpha}Al_{4m}O_{3m}$, wherein m is 3 or 4 and $\alpha$ is $= n_{Al(3)} - n_{O(2)} + n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Thus, aluminoxanes that can serve as optional cocatalysts in this invention are generally represented by formulas such as $(R-Al-O)_n$, $R(R-Al-O)_n AlR_2$, and the like, wherein the R group is typically a linear or branched $C_1-C_6$ alkyl such as methyl, ethyl, propyl, butyl, pentyl, or hexyl wherein n typically represents an integer from 1 to about 50. For example, the aluminoxane compounds of this invention include, but are not limited to, methylaluminoxane, ethylaluminoxane, n-propylaluminoxane, iso-propylaluminoxane, n-butylaluminoxane, t-butyl-aluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or any combination thereof.

While organoaluminoxanes with different types of R groups are encompassed by the present invention, methyl aluminoxane (MAO), ethyl aluminoxane, or isobutyl aluminoxane are typical optional cocatalysts used in the catalyst compositions of this invention. These aluminoxanes are prepared from trimethylaluminum, triethylaluminum, or triisobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096, which is herein incorporated by reference in its entirety.

The present invention contemplates many values of n in the aluminoxane formulas $(R-Al-O)_n$ and $R(R-Al-O)_n AlR_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present invention.

In preparing the catalyst composition of this invention comprising an optional aluminoxane, the molar ratio of the aluminum in the aluminoxane to the metallocene in the composition is usually from about 1:10 to about 100,000:1. In one aspect, the molar ratio of the aluminum in the aluminoxane to the metallocene in the composition is usually from about 5:1 to about 15,000:1. The amount of optional aluminoxane added to a polymerization zone is an amount within a range of about 0.01 mg/L to about 1000 mg/L, from about 0.1 mg/L to about 100 mg/L, or from about 1 mg/L to abut 50 mg/L.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water which is dissolved in an inert organic solvent may be reacted with an aluminum alkyl compound such as $AlR_3$ to form the desired organoaluminoxane compound. While not intending to be bound by this statement, it is believed that this synthetic method can afford a mixture of both linear and cyclic $(R-Al-O)_n$ aluminoxane species, both of which are encompassed by this invention. Alternatively, organoaluminoxanes may be prepared by reacting an aluminum alkyl compound such as $AlR_3$ with a hydrated salt, such as hydrated copper sulfate, in an inert organic solvent.

The Optional Organozinc Cocatalysts

One aspect of the invention encompasses a catalyst composition comprising at least one metallocene compound, at least one organochromium compound, at least one chemically-treated solid oxide, at least one organoaluminum compound, and, optionally, an organozinc cocatalyst. The organozinc cocatalyst employed in the present invention is selected from a compound with the following formula:

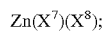

wherein $(X^7)$ is a hydrocarbyl having from 1 to about 20 carbon atoms; $(X^8)$ is selected from a hydrocarbyl, an alkoxide or an aryloxide having from 1 to about 20 carbon atoms, halide, or hydride. For example, the optional organozinc cocatalysts include, but are not limited to, dimethylzinc, diethylzinc, dipropylzinc, dibutylzinc, dineopentylzinc, di(trimethylsilylmethyl)zinc, and the like, including any combinations thereof.

The Optional Organoboron Cocatalyst

One aspect of the invention encompasses a catalyst composition comprising at least one metallocene compound, at least one organochromium compound, at least one chemically-treated solid oxide, at least one organoaluminum compound, and, optionally, an organoboron cocatalyst.

The organoboron compound comprises neutral boron compounds, borate salts, or combinations thereof. For example, the organoboron compounds of this invention can comprise a fluoroorgano boron compound, a fluoroorgano borate compound, or a combination thereof. Any fluoroorgano boron or fluoroorgano borate compound known in the art can be utilized. The term fluoroorgano boron compounds has its usual meaning to refer to neutral compounds of the form $BY_3$. The term fluoroorgano borate compound also has its usual meaning to refer to the monoanionic salts of a fluoroorgano boron compound of the form $[cation]^+[BY_4]^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this invention. In one aspect, the molar ratio of the organoboron compound to the metallocene compound in the composition is from about 0.1:1 to about 10:1. Typically, the amount of the fluoroorgano boron or fluoroorgano borate compound used as a cocatalyst for the metallocene is in a range of from about 0.5 mole to about 10 moles of boron compound per mole of metallocene compound. In another aspect of the present invention, the amount of fluoroorgano boron or fluoroorgano borate compound used as a cocatalyst for the metallocene is in a range of from about 0.8 mole to about 5 moles of boron compound per mole of metallocene compound.

The Optional Ionizing Ionic Compound Cocatalyst

One aspect of the invention encompasses a catalyst composition comprising at least one metallocene compound, at least one organochromium compound, at least one chemically-treated solid oxide, at least one organoaluminum compound, and, optionally, an ionizing ionic compound cocatalyst. Examples of ionizing ionic compound are disclosed in U.S. Pat. Nos. 5,576,259 and 5,807,938, each of which is incorporated herein by reference, in its entirety.

An ionizing ionic compound is an ionic compound which can function to enhance the activity of the catalyst composition. While not bound by theory, it is believed that the ionizing ionic compound may be capable of reacting with the first, second, or both metallocene compounds and converting the metallocenes into cationic metallocene compounds. Again, while not intending to be bound by theory, it is believed that the ionizing ionic compound may function as an ionizing compound by completely or partially extracting an anionic ligand, possibly a non-$\eta^5$-alkadienyl ligand such as ($X^3$) or ($X^4$) from the metallocene. However, the ionizing ionic compound is an activator regardless of whether it ionizes the metallocene, abstracts an ($X^3$) or ($X^4$) ligand in a fashion as to form an ion pair, weakens the metal-($X^3$) or metal-($X^4$) bond in the metallocenes, simply coordinates to an ($X^3$) or ($X^4$) ligand, or any other mechanisms by which activation may occur.

Further, it is not necessary that the ionizing ionic compound activate the metallocene only. The activation function of the ionizing ionic compound is evident in the enhanced activity of catalyst composition as a whole, as compared to a catalyst composition that does not comprise any ionizing ionic compound.

Examples of ionizing ionic compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetrakis(phenyl)borate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetrakis(phenyl)borate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetrakis(phenyl)borate, potassium tetrakis(p-tolyl)borate, potassium tetrakis(m-tolyl)borate, potassium tetrakis(2,4-dimethyl-phenyl)borate, potassium tetrakis(3,5-dimethylphenyl)borate, potassium tetrafluoroborate, tri(n-butyl)ammonium tetrakis(p-tolyl)aluminate, tri(n-butyl)ammonium tetrakis(m-tolyl)aluminate, tri(n-butyl)ammonium tetrakis(2,4-dimethyl)aluminate, tri(n-butyl)ammonium tetrakis(3,5-dimethylphenyl)aluminate, tri(n-butyl)ammonium tetrakis(pentafluorophenyl)aluminate, N,N-dimeihylanilinium tetrakis(p-tolyl)aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethylphenyl)aluminate, N,N-dimethylanilinium tetrakis (pentafluorophenyl)-aluminate, triphenylcarbenium tetrakis(p-tolyl)aluminate, triphenylcarbenium tetrakis(m-tolyl)-aluminate, triphenylcarbenium tetrakis(2,4-dimethylphenyl)aluminate, triphenylcarbenium tetrakis(3,5-dimethylphenyl)aluminate, triphenylcarbenium tetrakis(pentafluorophenyl)aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, tropylium tetrakis (pentafluorophenyl)aluminate, lithium tetrakis(pentafluorophenyl)aluminate, lithium tetrakis(phenyl)aluminate, lithium tetrakis(p-tolyl)aluminate, lithium tetrakis(m-tolyl)

aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetrakis(phenyl)aluminate, sodium tetrakis (p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetrakis(phenyl)aluminate, potassium tetrakis(p-tolyl)aluminate, potassium tetrakis(m-tolyl)-aluminate, potassium tetrakis(2,4-dimethylphenyl)aluminate, potassium tetrakis (3,5-dimethylphenyl)aluminate, potassium tetrafluoroaluminate, or any combination thereof. However, the ionizing ionic compound is not limited thereto in the present invention.

The Olefin Monomer

Unsaturated reactants that are useful in the polymerization processes with catalyst compositions and processes of this invention typically include olefin compounds having from about 2 to about 30 carbon atoms per molecule and having at least one olefinic double bond. This invention encompasses homopolymerization processes using a single olefin such as ethylene or propylene, as well as copolymerization reactions with at least one different olefinic compound. In one aspect of a copolymerization reaction of ethylene, copolymers of ethylene comprise a major amount of ethylene (>50 mole percent) and a minor amount of comonomer <50 mole percent), though this is not a requirement. The comonomers that can be copolymerized with ethylene can have from three to about 20 carbon atoms in their molecular chain.

Acyclic, cyclic, polycyclic, terminal ($\alpha$), internal, linear, branched, substituted, unsubstituted, functionalized, and non-functionalized olefins may be employed in this invention. For example, typical unsaturated compounds that may be polymerized with the catalysts of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, may also be polymerized as described above.

When a copolymer is desired, the monomer ethylene may be copolymerized with a comonomer. Examples of the comonomer include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, or the five normal decenes. In another aspect, the comonomer may be selected from 1-butene, 1-pentene, 1-hexene, 1-octene, 1-decene, or styrene.

The amount of comonomer introduced into a reaction zone to produce the copolymer is generally from about 0.01 to about 10 weight percent comonomer based on the total weight of the monomer and comonomer. In another aspect, the amount of comonomer introduced into a reactor zone is from about 0.01 to about 5 weight percent comonomer, and in still another aspect, from about 0.1 to about 4 weight percent comonomer based on the total weight of the monomer and comonomer. Alternatively, an amount sufficient to give the above described concentrations by weight, in the copolymer produced can be used.

While not intending to be bound by this theory, in the event that branched, substituted, or functionalized olefins are used as reactants, it is believed that steric hindrance may impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. In one aspect, at least one reactant for the catalyst compositions of this invention is ethylene, so the polymerizations are either homopolymerizations or copolymerizations with a different acyclic, cyclic, terminal, internal, linear, branched, substituted, or unsubstituted olefin. In addition, the catalyst compositions of this invention may be used in polymerization of diolefin compounds, including but not limited to, 1,3-butadiene, isoprene, 1,4-pentadiene, and 1,5-hexadiene.

Preparation of the Catalyst Composition

This invention encompasses a catalyst composition comprising the contact product of a metallocene compound, an organochromium compound, at least one chemically-treated solid oxide, and at least one organoaluminum compound. In another aspect, this invention encompasses methods of making the catalyst composition encompassing contacting a metallocene compound, an organochromium compound, at least one chemically-treated solid oxide, and at least one organoaluminum compound, in any order. In this aspect, an active catalyst composition is obtained when the catalyst components are contacted in any sequence or order.

In another aspect of this invention, the metallocene compound, the organochromium compound, or both can optionally be precontacted with an olefinic monomer, not necessarily the olefin monomer to be polymerized, and an organoaluminum cocatalyst for a first period of time prior to contacting this precontacted mixture with the chemically-treated solid oxide. In one aspect, the first period of time for contact, the precontact time, between the metallocene compound or compounds, the olefinic monomer, and the organoaluminum compound typically range from about 0.1 hours to about 24 hours, and from about 0.1 to about 1 hour. Precontact times from about 10 minutes to about 30 minutes are also typical.

In yet another aspect of this invention, once the precontacted mixture of the metallocene compound, organochromium compound, olefin monomer, and organoaluminum cocatalyst is contacted with the chemically treated solid oxide, this composition (further comprising the chemically treated solid oxide) is termed the postcontacted mixture. The postcontacted mixture may optionally be allowed to remain in contact for a second period of time, the postcontact time, prior to initiating the polymerization process. In one aspect, postcontact times between the precontacted mixture and the chemically treated solid oxide may range in time from about 0.1 hour to about 24 hours. In another aspect, for example, postcontact times from about 0.1 hour to about 1 hour are typical.

In one aspect, the metallocene compound, organochromium compound, and treated solid oxide are contacted together, for about 1 minute to about 24 hours, at temperatures from about 10° C. to about 200° C. to form a precontacted mixture. This mixture is then contacted with the organoaluminum compound to form a postcontacted mixture.

The precontacting, the postcontacting step, or both may increase the productivity of the catalyst as compared to the same catalyst composition that is prepared without precontacting or postcontacting. However, neither a precontacting step nor a postcontacting step are required for this invention.

The postcontacted mixture may be heated at a temperature and for a duration sufficient to allow adsorption, impregnation, or interaction of precontacted mixture and the chemically treated solid oxide, such that a portion of the components of the precontacted mixture is immobilized, adsorbed, or deposited thereon. For example, the postcontacted mixture may be heated from between about 10° C. to about 200° C. Temperatures between about 20° C. to about 95° C. are typical if the mixture is heated at all.

In one aspect, the chemically-treated solid oxide is calcined at a temperature from about 200° C. to about 900° C., and for a time of about 1 minute to about 100 hours. The calcined chemically-treated solid oxide is then contacted with at least one metallocene compound, at least one organochromium compound, at least one organoaluminum, and at least one olefin monomer to form a postcontacted mixture.

The molar ratio of the metallocene compound to the organochromium compound may be from about 100:1 to about 1:100. In another aspect the molar ratio of the metallocene compound to the organochromium compound may be from about 10:1 to about 1:10, or from about 5:1 to about 1:5.

The molar ratio of the metallocene compound to the organoaluminum compound may be from about 1:100 to about 1:1. In another aspect, the molar ratio of the metallocene compound to the organoaluminum compound may be from about 1:100 to about 1:5, and in another aspect, from about 1:50 to about 1:10. These molar ratios reflect the ratio of the total amount of metallocene compound to the total amount of organoaluminum compound in both the precontacted mixture and the postcontacted mixture combined.

When a precontacting step is used, generally, the molar ratio of olefin monomer to metallocene compound combined in the precontacted mixture may be from about 1:1 to about 1:1000, or from about 1:10 to about 1:100.

In a further aspect of this invention, the weight ratio of the metallocene compound to the chemically treated solid oxide may be from about 10:1 to about 0.0001:1. In yet another aspect of this invention, the weight ratio of the metallocene compound to the chemically treated solid oxide can be from about 1:1 to about 0.001:1, and in another aspect, from about 0.1:1 to about 0.001:1.

The weight ratio of the chemically treated solid oxide to the organoaluminum compound may range from about 1:10 to about 100:1. In another aspect, the weight ratio of the chemically treated solid oxide to the organoaluminum compound maybe from about 1:1 to about 100:1, and in yet another aspect, from about 1:1 to about 10:1.

The amount of organoaluminum ranges from about 0.01 ppm to about 1000 ppm by weight based on the weight of the diluent, In another aspect, the organoaluminum ranges from about 0.1 ppm to about 500 ppm by weight based on the weight of the diluent, or from about 1 ppm to about 150 ppm. The ratio of the chemically treated solid oxide to the diluent will be from about 1:1,000,000 to 1:1000. The amount of metallocene compound ranges from 0.001 ppm to about 100 ppm by weight based on the weight of the diluent, or from about 0.1 ppm to 50 ppm, or, in another aspect, from 0.1 ppm to 10 ppm.

Aluminoxanes are not required to form the catalyst composition disclosed herein, a feature that allows lower polymer production costs. Accordingly, the present invention can use $AlR_3$-type organoaluminum compounds and a chemically treated solid oxide in the absence of aluminoxanes. While not intending to be bound by theory, it is believed that the organoaluminum compounds likely do not activate the metallocene catalyst in the same manner as an organoaluminoxane.

Additionally, no expensive borate compounds or $MgCl_2$ are required to form the catalyst composition of this invention, although aluminoxanes, organoboron compounds, ionizing ionic compounds, organozinc compounds, $MgCl_2$, or any combination thereof can optionally be used in the catalyst composition of this invention. Further, in one aspect, cocatalysts such as aluminoxanes, organoboron compounds, ionizing ionic compounds, organozinc compounds, or any combination thereof may be used as cocatalysts with the metallocene compound, either in the presence or in the absence of the chemically treated solid oxide, and either in the presence or in the absence of the organoaluminum compounds.

The catalytic activity of the catalyst composition of this invention is typically greater than or equal to about 100 grams polyethylene per gram of chemically-treated solid oxide per hour (abbreviated gP/(gCTSO·hr)). In another aspect, the catalyst composition of this invention may be characterized by an activity of greater than or equal to about 200 gP/(gCTSO·hr), and in another aspect, an activity of greater than or equal to about 300 gP/(gCTSO·hr). This activity is measured under slurry polymerization conditions, using isobutane as the diluent, and with a polymerization temperature of about 90° C., and an ethylene pressure of about 550 psig. The reactor should have substantially no indication of any wall scale, coating or other forms of fouling upon making these measurements.

Utility of the Catalyst Composition in Polymerization Processes

Polymerizations using the catalysts of this invention can be carried out in any manner known in the art. Such processes that can polymerize monomers into polymers include, but are not limited to slurry polymerizations, gas phase polymerizations, solution polymerizations, and multireactor combinations thereof. Thus, any polymerization zone known in the art to produce olefin-containing polymers can be utilized. For example, a stirred reactor can be utilized for a batch process, or the reaction can be carried out continuously in a loop reactor or in a continuous stirred reactor. Typically, the polymerizations disclosed herein are carried out using a slurry polymerization process in a loop reaction zone. Suitable diluents used in slurry polymerization are well known in the art and include hydrocarbons which are liquid under reaction conditions. The term "diluent" as used in this disclosure does not necessarily mean an inert material, as this term is meant to include compounds and compositions that may contribute to polymerization process. Examples of hydrocarbons that can be used as diluents include, but are not limited to, cyclohexane, isobutane, n-butane, propane, n-pentane, isopentane, neopentane, and n-hexane. Typically, isobutane is used as the diluent in a slurry polymerization. Examples of this technology are found in U.S. Pat. Nos. 4,424,341; 4,501,885; 4,613,484; 4,737,280; and 5,597,892; each of which is incorporated by reference herein, in its entirety.

Polymerization reactors suitable for the present invention can comprise at least one raw material feed system, at least one feed system for catalyst or catalyst components, at least one reactor system, at least one polymer recovery system or any suitable combination thereof. Suitable reactors for the present invention can further comprise any one, or combination of, a catalyst storage system, an extrusion system, a cooling system, a diluent recycling system, or a control system. Such reactors can comprise continuous take-off and direct recycling of catalyst, diluent, and polymer. Generally, continuous processes can comprise the continuous introduction of a monomer, a catalyst, and a diluent into a polymerization reactor and the continuous removal from this reactor of a suspension comprising polymer particles and the diluent.

In one aspect of the invention, the polymerization reactor system can comprise at least one loop slurry reactor. Such reactors are known in the art and can comprise vertical or horizontal loops. Such loops can comprise a single loop or a series of loops. Multiple loop reactors can comprise both vertical and horizontal loops. The slurry polymerization can be performed in an organic solvent that can disperse the catalyst and polymer. Examples of suitable solvents include butane, hexane, cyclohexane, octane, and isobutane. Monomer, solvent, catalyst and any comonomer are continuously fed to a loop reactor where polymerization occurs. Polymerization can occur at low temperatures and pressures. Reactor effluent can be flashed to remove the solid resin.

In yet another aspect of this invention, the polymerization reactor can comprise at least one gas phase reactor. Such systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In still another aspect of the invention, the polymerization reactor can comprise a tubular reactor. Tubular reactors can make polymers by free radical initiation, or by employing the catalysts typically used for coordination polymerization. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams are intermixed for polymerization. Heat and pressure can be employed appropriately to obtain optimal polymerization reaction conditions.

In another aspect of the invention, the polymerization reactor can comprise a solution polymerization reactor. During solution polymerization, the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed during polymerization to obtain better temperature control and to maintain uniform polymerization mixtures throughout the polymerization zone. Adequate means are utilized for dissipating the exothermic heat of polymerization. The polymerization can be effected in a batch manner, or in a continuous manner. The reactor can comprise a series of at least one separator that employs high pressure and low pressure to separate the desired polymer.

In a further aspect of the invention, the polymerization reactor system can comprise the combination of two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors.

Polymerization temperature for this invention typically ranges from about 60° C. to about 280° C., with a polymerization reaction temperature more typically operating between about 70° C. to about 110° C.

The polymerization reaction typically occurs in an inert atmosphere, that is, in atmosphere substantial free of oxygen and under substantially anhydrous conditions, thus, in the absence of water as the reaction begins. Therefore, a dry, inert atmosphere, for example, dry nitrogen or dry argon, is typically employed in the polymerization reactor.

The polymerization reaction pressure can be any pressure that does not adversely affect the polymerization reaction, and it typically conducted at a pressure higher than the pretreatment pressures. Generally, polymerization pressures are from about atmospheric pressure to about 1000 psig, more typically from about 50 psig to about 800 psig. Further, hydrogen can be used in the polymerization process of this invention to control polymer molecular weight.

After the polymers are produced, they can be formed into various articles, including but not limited to, household containers, utensils, film products, drums, fuel tanks, pipes, geomembranes, and liners. Various processes can form these articles. Usually, additives and modifiers are added to the polymer in order to provide desired effects. By using the invention described herein, articles can likely be produced at a lower cost, while maintaining most or all of the unique properties of polymers produced with metallocene-organochromium catalysts.

Comparison of Metallocene, Organochromium, and Metallocene-Organochromium Catalyst Resins FIG. 1 illustrates the polydispersities of resins obtained from a bis(n-butylcyclopentadienyl)zirconium dichloride catalyst (Example 4), a dicumene chromium catalyst (Example 3), and a combination bis(n-butylcyclopentadienyl) zirconium dichloride/dicumene chromium catalyst (Example 5). As seen in FIG. 1, the metallocene-produced resin (Example 4) exhibits a narrower molecular weight distribution, while the organochromium-produced resin control (Example 3) exhibits the broadest molecular weight distribution. In comparison, the metallocene-organochromium-produced resin (Example 5) exhibits an intermediate molecular weight distribution. The metallocene-organochromium-produced resin was characterized by a high-load melt index (HLMI) of about 0.275 g/10 min and a polydispersity of about 64.5. FIG. 1 shows that the combination metallocene-organochromium catalyst contains elements of both parents. The metallocene-organochromium resin shows a central high peak from the metallocene component, and broad tails on both high and low MW sides from the chromium component.

Figure 2:
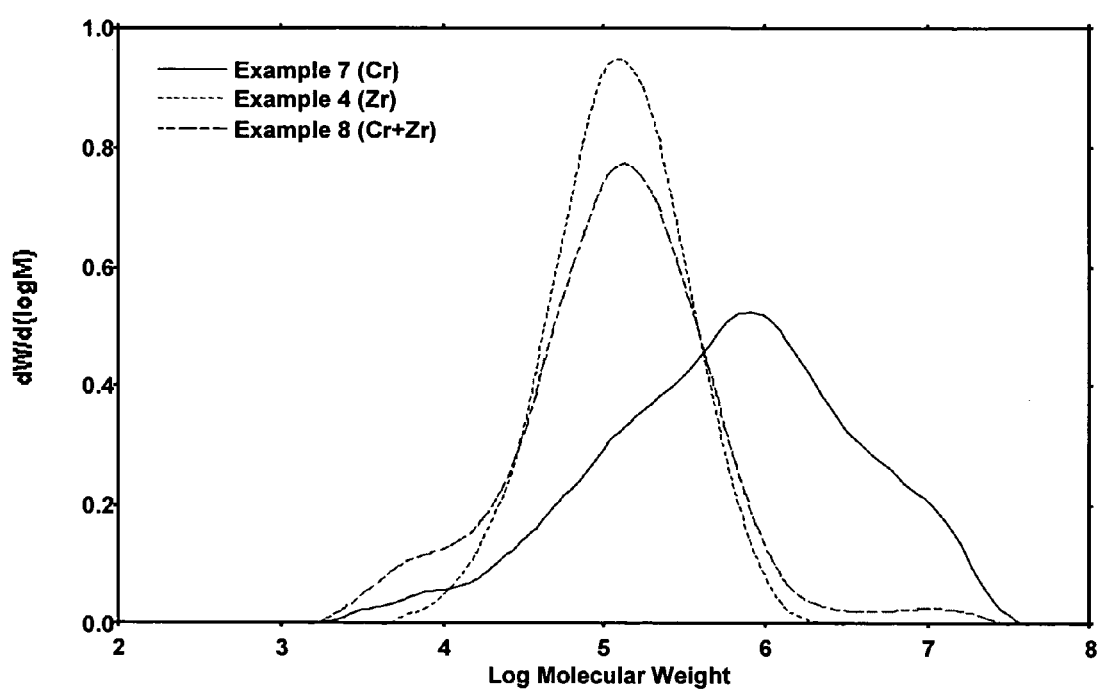
FIG. 2 represents a comparison of polyolefin polydispersities obtained using a bis(n-butylcyclopentadienyl)zirconium dichloride catalyst, chromocene catalyst, and a combination bis(n-butylcyclopentadienyl)zirconium dichloride/chromocene catalyst.

FIG. 2 illustrates the polydispersities of resins obtained from a bis(n-butylcyclopentadienyl)zirconium dichloride catalyst (Example 4), a chromocene catalyst (Example 7), and a combination bis(n-butylcyclopentadienyl)zirconium dichloride/chromocene catalyst (Example 8). FIG. 2 shows that the combination metallocene-organochromium catalyst contains elements of both parents. The chromocene catalyst contributes the high molecular weight tail of the metallocene-organochromium-produced resin Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substituents. The general structure also encompasses all enantiomers, diastereomers, and other optical isomers whether in enantiomeric or racemic forms, as well as mixtures of stereoisomers, as the context requires.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were carried out under an inert atmosphere such as nitrogen and/or argon. Solvents were purchased from commercial sources and were typically dried prior to use. Unless otherwise specified, reagents were obtained from commercial sources.

General Test Methods

Density

Density (g/cc) was measured on a compression molded sample, cooled at about 15° C. per hour, and conditioned for about 40 hours at room temperature in accordance with ASTM D-1505-68 and ASTM D-1928 procedure C.

Melt Index

Melt index (MI, g/10 min) was measured according to ASTM D-1238, Condition 190/2.16(190° C., 2.16 kg).

High Load Melt Index

High load melt index (HLMI, g/10 min) was determined in accordance with ASTM D-1238, Condition 190/2.16 (190° C., 2.16 kg).

Molecular Weight and Molecular Weight Distribution

Molecular weight ($M_w$) and molecular weight distribution data was obtained using a Waters 150 CV gel permeation chromatograph with trichlorobenzene (TCB) as the solvent, with a flow rate of 1 mL/min at a temperature of 140° C. 2,6-di-tert-butyl-4-methylphenol (BHT) at a concentration of 1.0 g/L was used as a stabilizer in the TCB. An injection volume of 220 L was used with a nominal polymer concentration of 0.3 g/L (at room temperature). Dissolution of the sample in stabilized TCB was carried out by heating at 160 to 170° C. for 20 hours with occasional gentle agitation. Two Waters HT-6E columns (7.8×300 mm) were used. The columns were calibrated with a broad linear polyethylene standard (Marlex® BHB 5003 resin) for which the molecular weight had been determined.

EXAMPLE 1

Preparation of the Fluorided Silica-Alumina Support

Silica-alumina was obtained from Grace Davison, a division of W.R. Grace and Company, as MS 13-110 containing about 13% alumina and about 87% silica. The silica-alumina had a pore volume of about 1.2 cc/g and a surface area of about 450 m²/g. The silica-alumina was impregnated with about 0.1 g ammonium bifluoride per gram of the support. The ammonium bifluoride was applied in the form of an aqueous solution. The resulting damp powder was dried for about 16 hours at about 110° C. Ten grams of the fluorided silica-alumina was placed in a 1.75 inch quartz tube fitted with a sintered quartz disk at the bottom. Air or nitrogen, dried by passing through a 13× molecular sieve column, was blown upward through the disk at a linear rate of about 1.6 to about 1.8 standard cubic feet per hour. An electric furnace around the quartz tube was then turned on and the temperature was raised at about 400° C./hr to 450° C. and held at about 450° C. for 3 hours. The calcined fluorided silica-alumina was collected and stored under dry nitrogen.

EXAMPLE 2

Preparation of the Dicumene Chromium Catalyst

Fluorided silica-alumina was prepared as described in Example 1. The fluorided silica-alumina was found to have a surface area of about 300 m²/g and a pore volume of about 1.1 cc/g. Dicumene chromium (0) was impregnated onto this fluorided silica-alumina support from a heptane solution in an amount equal to 1 wt % chromium based on the weight of the support. The heptane was then evaporated off the support under an atmosphere of flowing nitrogen, while the catalyst was warmed to about 50° C.

EXAMPLE 3

Polymerization Run Using the Dicumene Chromium Catalyst

To a dry 2.2 L steel reactor at about 90° C. was charged 0.5827 g of catalyst prepared as in Example 2. The reactor was equipped with a marine stirrer running at about 400 rpm and was surrounded by a steel jacket containing boiling methanol with a connection to a steel condenser. The boiling point of the methanol was controlled by varying nitrogen pressure applied to the condenser and the jacket, which permitted temperature control to within about 0.5° C. The run was allowed to proceed at an ethylene pressure of about 550 psig, a temperature of about 90° C., using isobutane as a diluent. As ethylene was consumed, more ethylene flowed in to maintain the pressure. The activity was noted by recording the flow of ethylene into the reactor to maintain the set pressure. After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. After depressurizing the reactor, 83 grams of polymer were recovered. This polymer had a melt index of zero and a HLMI of 5.83. Density was 0.9540 and molecular weight (Mw) was 948,000 g/mol. Polydispersity was 243.

EXAMPLE 4

Polymerization Run Using the bis(n-butylcyclopentadienyl) zirconium dichloride Catalyst The fluorided silica-alumina used was prepared as described in Example 1. To a dry 2.2 L steel reactor was charged 0.1585 grams of fluorided silica-alumina followed by 2 mL of 0.5 wt % solution of bis(n-butylcyclopentadienyl)zirconium dichloride in toluene by weight. A 600 mL amount of isobutane was added, then 0.5 mL of triethylaluminum (1M in heptane), and finally another 600 mL of isobutane. The reactor temperature was raised to 90° C. and then ethylene was added at 550 psig. After 1 hour the reaction was stopped as above and 271 grams polyethylene was recovered. The polymer had a 0.21 melt index and a high load melt index of 3.48. The density was 0.9478 gm/cc. The molecular weight (Mw) was 184,000 g/mol, and the polydispersity (Mw/Mn) was 2.7.

EXAMPLE 5

Polymerization Run Using the Combination bis(n-butylcyclopentadienyl)zirconium dichloride/dicumene chromium Catalyst In this run, 0.2969 grams of the catalyst composition prepared in Example 2 was charged to a dry 2.2 L steel reactor followed by 2 ml of a toluene solution containing about 0.5% bis(n-butylcyclopentadienyl)zirconium dichloride by weight. 600 mL of isobutane was added, then 0.5 mL of triethylaluminum (1M in heptane), and finally another 600 mL of isobutane. The reactor temperature was raised to 90° C. and then ethylene was added at 550 psig. After 87 minutes the reaction was stopped and 58 g of dry polyethylene powder was removed from the reactor. It had a melt index of zero, a high load melt index of 0.3, and a density of 0.9497. Bulk density was 0.393 g/cc, about twice the usual value obtained without addition of chromium. This material was found to have a weight average molecular weight of 1,164,000 g/mol, and a polydispersity (Mw/Mn) of 70.3.

EXAMPLE 6

Preparation of the Chromocene Catalyst

The fluorided silica-alumina used was prepared as described in Example 1. Chromocene was impregnated onto this fluorided silica-alumina from a heptane solution in an amount equal to 1 wt % chromium based on the weight of the support. The heptane was then evaporated off the support under an atmosphere of flowing nitrogen, while the catalyst was warmed to about 50° C.

EXAMPLE 7

Polymerization Run Using the Chromocene Catalyst

To a dry 2.2 L steel reactor was charged 0.3200 grams of the catalyst prepared in Example 6. The reactor temperature was raised to 90° C. and then ethylene was added to 550 psig. After 48 minutes 10 g of PE was taken from the reactor. This polymer had zero melt index and zero high load melt index. The density of the polymer was 0.9411 g/cc. The polymer was found to have a molecular weight (Mw) equal to 2,117,000 g/mol and a polydispersity (Mw/Mn) equal to 25.6.

EXAMPLE 8

Polymerization Run Using bis(n-butylcyclopentadienyl)zirconium dichloride/chromocene Catalyst In this run, 0.0819 grams of the catalyst composition prepared in Example 6 was charged to a dry 2.2 L steel reactor followed by 2 ml of a toluene solution containing about 0.5% bis(n-butylcyclopentadienyl)zirconium dichloride by weight. 600 mL of isobutane was added, then 0.5 mL of triethylaluminum (1M in heptane), and finally another 600 mL of isobutane. The reactor temperature was raised to 90° C. and then ethylene was added at 550 psig. After 61 minutes the reaction was stopped and 66 g. of dry polyethylene powder was removed from the reactor. The polymer had a melt index of zero, a high load melt index of 1.16, and a density of 0.9482 gm/cc. The polymer was found to have a molecular weight (Mw) equal to 412,000 g/mol and a polydispersity (Mw/Mn) equal to 8.4.

We claim:

1. A catalyst composition comprising the contact product of at least one metallocene compound, at least one organochromium compound, at least one chemically-treated solid oxide, and at least one organoaluminum compound, wherein:

a) the at least one metallocene compound has the following formula:

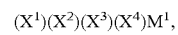

wherein $M^1$ is titanium, zirconium, or hafnium;

wherein $(X^1)$ is a cyclopentadienyl, an indenyl, a fluorenyl, a substituted cyclopentadienyl, a substituted indenyl, or a substituted fluorenyl;

wherein substituents on $(X^1)$ are aliphatic groups, cyclic groups, combinations of aliphatic and cyclic groups, silyl groups, alkyl halide groups, halides, organometallic groups, phosphorus groups, nitrogen groups, silicon groups, phosphorus groups, boron groups, germanium groups, or hydrogen;

wherein at least one substituent on $(X^1)$ can be a bridging group which connects $(X^1)$ and $(X^2)$;

wherein $(X^3)$ and $(X^4)$ are independently a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein $(X^2)$ is a cyclopentadienyl, an indenyl, a fluorenyl, a substituted cyclopentadienyl, a substituted indenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein substituents on $(X^2)$ are aliphatic groups, cyclic groups, combinations of aliphatic groups and cyclic groups, silyl groups, alkyl halide groups, halides, organometallic groups, phosphorus groups, nitrogen groups, silicon groups, boron groups, germanium groups, or hydrogen; and wherein at least one substituent on $(X^2)$ can be a bridging group which connects $(X^1)$ and $(X^2)$;

b) the at least one organochromium compound is a compound having the following formula:
  i) $CrR_n$,
    wherein R is a hydrocarbyl having from 1 to about 20 carbon atoms; and
    wherein n is an integer from 2 to 4 inclusive; or
  ii) $Cr(\eta_6-C_6R'_6)_2$,
    wherein R' independently is hydrogen or an alky radical having from 1 to 6 carbon atoms; and c) the at least one chemically-treated solid oxide comprises a solid oxide treated with at least one electron-withdrawing anion source compound;

wherein the molar ratio of the at least one metallocene compound to the at least one organochromium compound is from about 100:1 to about 1:100;

wherein the weight ratio of the at least one metallocene compound to the at least one chemically-treated solid oxide is from about 10:1 to about 0.0001:1; and wherein the catalyst composition is substantially free of aluminoxanes, organoborons, and ionizing ionic compounds.

2. The catalyst composition of claim 1, wherein the at least one organoaluminum compound has the following formula:

$Al(X^5)_n(X^6)_{3-n}$;

wherein $(X^5)$ is a hydrocarbyl having from 1 to about 20 carbon atoms; $(X^6)$ is an alkoxide or aryloxide having from 1 to about 20 carbon atoms, a halide, or a hydride; and n is a number from 1 to 3, inclusive.

3. The catalyst composition of claim 1, wherein the solid oxide is silica, alumina, silica-alumina, aluminum phosphate, heteropolytungstates, titania, zirconia, magnesia, boria, zinc oxide, any mixed oxide thereof, or any mixture thereof; and the at least one electron-withdrawing anion source compound is a fluoride, a chloride, a bromide, a phosphate, a triflate, a bisulfate, a sulfate, any salt thereof, any acid thereof, or any combination thereof.

4. The catalyst composition of claim 1, wherein the at least one metallocene compound is:

bis(cyclopentadienyl)hafnium dichloride; 1,2-ethanediyl-bis($\eta^5$-1-indenyl)di-n-butoxyhafnium; 1,2-ethanediyl-bis($\eta^5$-1-indenyl)dimethylzirconium; 3,3-pentanediyl-bis(($\eta^5$-4,5,6,7-tetrahydro-1-indenyl)hafnium dichloride; methylphenylsilylbis($\eta^5$-4,5,6,7-tetrahydro-1-indenyl)zirconium dichloride; bis(n-butylcyclopentadienyl)bis(di-t-butylamido)hafnium; bis(n-butylcyclopentadienyl)zirconium dichloride; dimethylsilylbis(1-indenyl)zirconium dichloride; octylphenylsilylbis(1-indenyl)hafnium dichloride; dimethylsilylbis($\eta^5$-4,5,6,7-tetrahydro-1-indenyl)zirconium dichloride; dimethylsilylbis(2-methyl-1-indenyl)zirconium dichloride; 1,2-ethanediylbis(9-fluorenyl)zirconium dichloride; indenyl diethoxy titanium (IV) chloride; (isopropylamidodimethylsilyl)cyclopentadienyltitanium dichloride; bis(pentamethylcyclopentadienyl)zirconium dichloride; bis(indenyl)zirconium dichloride; bis(indenyl)zirconium dichloride; methyloctylsilyl bis(9-fluorenyl)zirconium dichloride; bis-[1-(N,N-diisopropylamino)boratebenzene]hydridozirconium trifluoromethylsulfonate; or any combination thereof.

5. The catalyst composition of claim 1, wherein the at least one metallocene compound is:

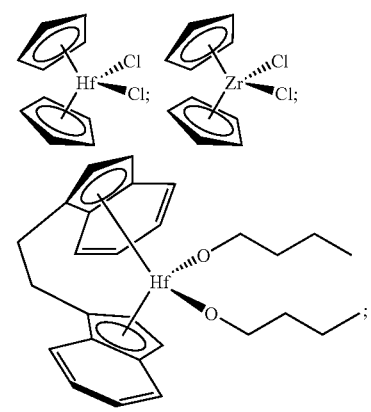

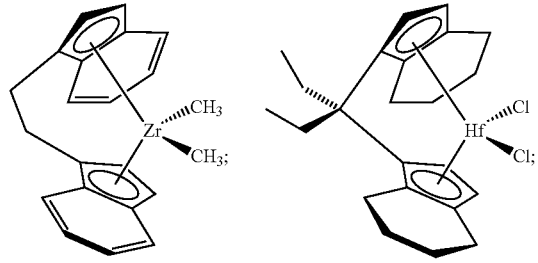

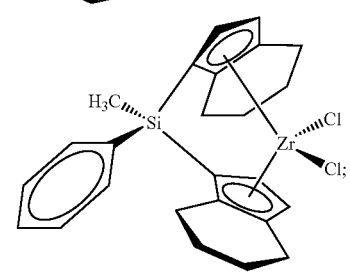

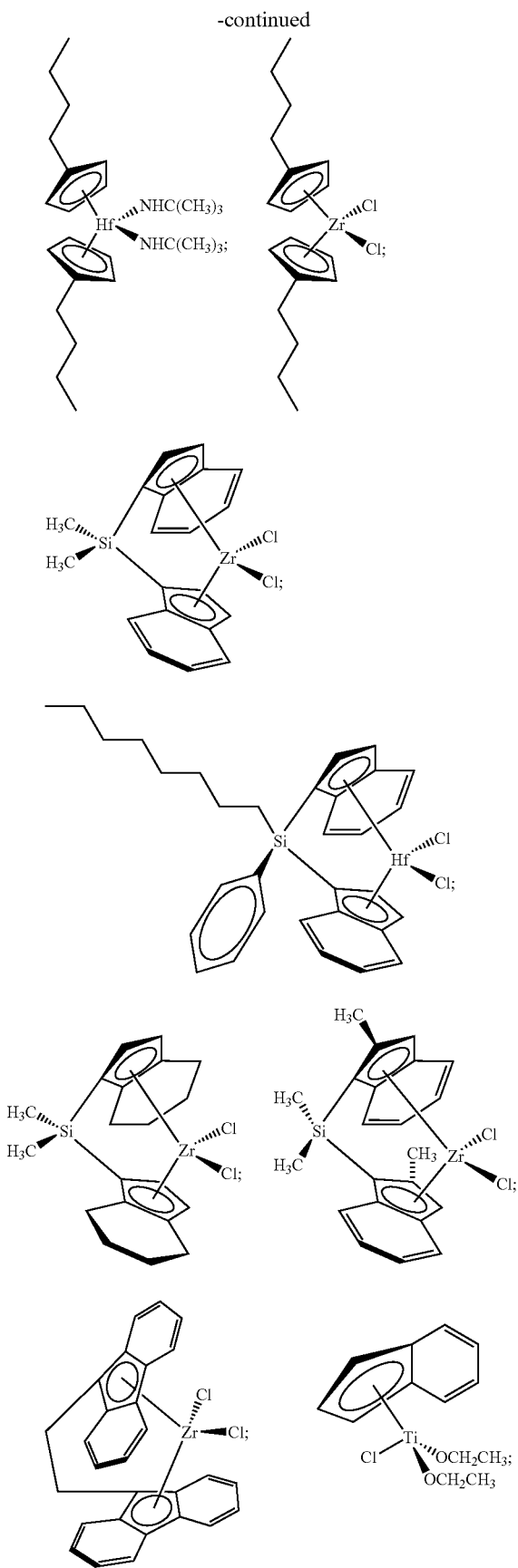

6. The catalyst composition of claim 1, wherein the at least one organochromium compound is:

bisbenzene chromium(0); dicumene chromium(0); bis(mesitylene chromium(0); biscyclopentadienylchromium(chromocene); bis(methylcyclopentadienyl)chromium(II); bis(1,3-bis(trimethylsilyl)allyl)chromium(II); bis(trimethylsilylmethyl)chromium(II); bis(2,5-dimethylpentadienyl)chromium(II); ((tetramethylcyclopentadienyl)(t-butylamino)dimethylsilyl)(trimethylsilylmethyl)chromium(II); diallyl chromium(II); (pentamethylcyclopentadienyl)bis(benzyl)chromium(II) pyridine adduct; triallyl chromium (III); tris(bis(trimethylsilyl)methyl)chromium(III); (pentamethylcyclopentadienyl)bis(trimethylsilylmethyl)chromium(III); tetraallylchromium(IV); tetramethylchromium(IV); tetrakis(benzyl)chromium(IV);

tetrakis-neopentyl chromium(IV), tetrakis(trimethylsilylmethyl)chromium(IV); tetrakis(isopropyl)chromium (IV); tetrakis(2-phenyl-2-methylpropyl)chromium (IV); or any combination thereof.

7. The catalyst composition of claim 1, wherein the at least one organochromium compound is:

($\eta^6$-$C_6H_6$)Cr(CO)$_3$; [($\eta^5$-$C_5H_5$)Cr(CO)$_3$]$_2$; Cr(t-butyl)$_4$; Cr(CH$_2$CPh$_3$)$_4$; Cr(MeC$_6$H$_5$)$_2$; Cr(Me$_2$C$_6$H$_4$)$_2$; CR(Me$_3$C$_6$H$_3$)$_2$; Cr(C$_6$Me$_6$)$_2$; Cr($\eta^6$-naphthalene)$_2$; regioisomers thereof; stereoisomers thereof; or any combination thereof.

8. The catalyst composition of claim 1, wherein:
a) the at least one metallocene compound is bis(n-butylcyclopentadienyl)zirconium dichloride; bis(indenyl)zirconium dichloride; dimethylsilylbis(1-indenyl)zirconium dichloride; or methyloctylsilyl bis(9-fluorenyl)zirconium dichloride;
b) the at least one organochromium compound is dicumene chromium (0); bisbenzene chromium(0); or chromocene;
c) the at least one chemically-treated solid oxide is fluorided silica-alumina or fluorided aluminophosphate; and
d) the at least one organoaluminum compound is triethylaluminum or triisobutylaluminum.

9. The catalyst composition of claim 1, wherein the at least one chemically-treated solid oxide is fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof.

10. The catalyst composition of claim 1, wherein the at least one chemically-treated solid oxide further comprises a metal or metal ion which is zinc, nickel, vanadium, silver, copper, gallium, tin, tungsten, molybdenum, or any combination thereof.

11. The catalyst composition of claim 1, wherein the at least one electron-withdrawing anion source compound is an electron-withdrawing anion, a salt of an electron-withdrawing anion, an acid of an electron-withdrawing anion, a combination of two or more electron-withdrawing anions, a combination of two or more salts of an electron withdrawing anion, a combination of two or more acids of an electron withdrawing anion, or any combination thereof.

12. The catalyst composition of claim 11, wherein the at least one electron-withdrawing anion is fluoride, chloride, bromide, phosphate, triflate, bisulfate, sulfate, or any combination thereof.

13. The catalyst composition of claim 1, wherein the weight ratio of the at least one chemically-treated solid oxide to the at least one organoaluminum compound is from about 1:10 to about 100:1.

14. The catalyst composition of claim 1, wherein the at least one organoaluminum compound is trimethylaluminum, triethylaluminum, tri-n-propylaluminum, diethylaluminum ethoxide, tri-n-butylaluminum, diisobutylaluminum hydride; triisobutylaluminum, diethylaluminum chloride, or any combination thereof.

15. The catalyst composition of claim 1, further comprising at least one organozinc compound.

16. A method of making a catalyst composition comprising contacting at least one metallocene compound, at least one organochromium compound, at least one chemically-treated solid oxide, and at least one organoaluminum compound, wherein:

a) the metallocene compound has the following formula:

(X$^1$)(X$^2$)(X$^3$)(X$^4$)M$^1$, wherein M$^1$ is titanium, zirconium, or hafnium;
wherein (X$^1$) is a cyclopentadienyl, an indenyl, a fluorenyl, a substituted cyclopentadienyl, a substituted indenyl, or a substituted fluorenyl;
wherein substituents on (X$^1$) are aliphatic groups, cyclic groups, combinations of aliphatic and cyclic groups, silyl groups, alkyl halide groups, halides, organometallic groups, phosphorus groups, nitrogen groups, silicon groups, phosphorus groups, boron groups, germanium groups, or hydrogen;
wherein at least one substituent on (X$^1$) can be a bridging group which connects (X$^1$) and (X$^2$);
wherein (X$^3$) and (X$^4$) are independently a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;
wherein (X$^2$) is a cyclopentadienyl, an indenyl, a fluorenyl, a substituted cyclopentadienyl, a substituted indenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;
wherein substituents on (X$^2$) are aliphatic groups, cyclic groups, combinations of aliphatic groups and cyclic groups, silyl groups, alkyl halide groups, halides, organometallic groups, phosphorus groups, nitrogen groups, silicon groups, boron groups, germanium groups, or hydrogen; and
wherein at least one substituent on (X$^2$) can be a bridging group which connects (X$^1$) and (X$^2$);

b) the at least one organochromium compound is a compound having the following formula:
i) CrR$_n$,
wherein R is a hydrocarbyl having from 1 to about 20 carbon atoms; and
wherein n is an integer from 2 to 4 inclusive; or
ii) Cr($\eta^6$-$C_6R'_6$)$_2$,
wherein R' independently is hydrogen or an alky radical having from 1 to 6 carbon atoms; and c) the at least one chemically-treated solid oxide comprises a solid oxide treated with at least one electron-withdrawing anion source compound;

wherein the molar ratio of the at least one metallocene compound to the at least one organochromium compound is from about 100:1 to about 1:100;

wherein the weight ratio of the at least one metallocene compound to the at least one chemically-treated solid oxide is from about 10:1 to about 0.0001:1; and wherein the catalyst composition is substantially free of aluminoxanes, organoborons, and ionizing ionic compounds.

17. A method of polymerizing olefins comprising contacting at least one type of olefin monomer with a catalyst composition under polymerization conditions, wherein the catalyst composition comprises the contact product of at least one metallocene compound, at least one organochromium compound, at least one chemically-treated solid oxide, and at least one organoaluminum compound, wherein:

a) the metallocene compound has the following formula:

$(X^1)(X^2)(X^3)(X^4)M^1$, wherein $M^1$ is titanium, zirconium, or hafnium;

wherein $(X^1)$ is a cyclopentadienyl, an indenyl, a fluorenyl, a substituted cyclopentadienyl, a substituted indenyl, or a substituted fluorenyl;

wherein substituents on $(X^1)$ are aliphatic groups, cyclic groups, combinations of aliphatic and cyclic groups, silyl groups, alkyl halide groups, halides, organometallic groups, phosphorus groups, nitrogen groups, silicon groups, phosphorus groups, boron groups, germanium groups, or hydrogen;

wherein at least one substituent on $(X^1)$ can be a bridging group which connects $(X^1)$ and $(X^2)$;

wherein $(X^3)$ and $(X^4)$ are independently a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein $(X^2)$ is a cyclopentadienyl, an indenyl, a fluorenyl, a substituted cyclopentadienyl, a substituted indenyl, a substituted fluorenyl, a halide, an aliphatic group, a substituted aliphatic group, a cyclic group, a substituted cyclic group, a combination of an aliphatic group and a cyclic group, a combination of a substituted aliphatic group and a cyclic group, a combination of an aliphatic group and a substituted cyclic group, a combination of a substituted aliphatic group and a substituted cyclic group, an amido group, a substituted amido group, a phosphido group, a substituted phosphido group, an alkyloxide group, a substituted alkyloxide group, an aryloxide group, a substituted aryloxide group, an organometallic group, or a substituted organometallic group;

wherein substituents on $(X^2)$ are aliphatic groups, cyclic groups, combinations of aliphatic groups and cyclic groups, silyl groups, alkyl halide groups, halides, organometallic groups, phosphorus groups, nitrogen groups, silicon groups, boron groups, germanium groups, or hydrogen; and wherein at least one substituent on $(X^2)$ can be a bridging group which connects $(X^1)$ and $(X^2)$;

b) the at least one organochromium compound is a compound having the following formula:

i) $CrR_n$, wherein R is a hydrocarbyl having from 1 to about 20 carbon atoms; and wherein n is an integer from 2 to 4 inclusive; or ii) $Cr(\eta_6\text{-}C_6R'_6)_2$, wherein R' independently is hydrogen or an alky radical having from 1 to 6 carbon atoms; and c) the at least one chemically-treated solid oxide comprises a solid oxide treated with at least one electron-withdrawing anion source compound;

wherein the molar ratio of the at least one metallocene compound to the at least one organochromium compound is from about 100:1 to about 1:100;

wherein the weight ratio of the at least one metallocene compound to the at least one chemically-treated solid oxide is from about 10:1 to about 0.0001:1; and wherein the catalyst composition is substantially free of aluminoxanes, organoborons, and ionizing ionic compounds.

18. The method of claim 17, wherein the catalyst composition is contacted with ethylene and at least one other olefin which is 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, or 3-heptene.

19. The method of claim 17, wherein the catalyst composition is contacted with ethylene and 1-hexene.

20. The method of claim 17, wherein the catalyst composition is contacted with ethylene.

* * * * *